(12) United States Patent
Lortie et al.

(10) Patent No.: US 12,405,704 B1
(45) Date of Patent: Sep. 2, 2025

(54) INTERPRETING USER MOVEMENT AS DIRECT TOUCH USER INTERFACE INTERACTIONS

(71) Applicant: Apple Inc., Cupertino, CA (US)

(72) Inventors: Chase B. Lortie, San Francisco, CA (US); David J. Meyer, Menlo Park, CA (US); Daniel J. Brewer, San Jose, CA (US); Julian K. Shutzberg, San Francisco, CA (US)

(73) Assignee: APPLE INC., Cupertino, CA (US)

( * ) Notice: Subject to any disclaimer, the term of this patent is extended or adjusted under 35 U.S.C. 154(b) by 66 days.

(21) Appl. No.: 18/370,321

(22) Filed: Sep. 19, 2023

Related U.S. Application Data

(60) Provisional application No. 63/409,326, filed on Sep. 23, 2022.

(51) Int. Cl.
| | |
|---|---|
| *G06F 3/01* | (2006.01) |
| *G02B 27/01* | (2006.01) |
| *G06F 3/04815* | (2022.01) |
| *G06T 19/00* | (2011.01) |

(52) U.S. Cl.
CPC ....... *G06F 3/04815* (2013.01); *G02B 27/017* (2013.01); *G06F 3/011* (2013.01); *G06T 19/006* (2013.01)

(58) Field of Classification Search
CPC ... G06F 3/04815; G06F 3/011; G02B 27/017; G06T 19/006
See application file for complete search history.

(56) References Cited

U.S. PATENT DOCUMENTS

| | | | |
|---|---|---|---|
| 1,173,824 | A | 2/1916 | Iskandar et al. |
| 5,515,488 | A | 5/1996 | Hoppe |
| 5,524,195 | A | 6/1996 | Clanton, III |
| 5,610,828 | A | 3/1997 | Kodosky |

(Continued)

FOREIGN PATENT DOCUMENTS

| | | |
|---|---|---|
| CA | 3033344 A1 | 2/2018 |
| CN | 104714771 A | 6/2015 |

(Continued)

OTHER PUBLICATIONS

U.S. Patent and Trademark Office, Final Office Action, U.S. Appl. No. 18/182,300, 34 pages, Oct. 31, 2024.

(Continued)

*Primary Examiner* — Haoshian Shih
(74) *Attorney, Agent, or Firm* — Thompson Hine LLP

(57) ABSTRACT

Various implementations disclosed interpret direct touch-based gestures, such as drag and scroll gestures, made by a user virtually touching one position of a user interface and moving their hand to another position of the user interface. For example, such gestures may be made relative to a user interface presented in an extended reality (XR) environment. In some implementations, a user movement is interpreted using one or more techniques that avoid unexpected gain or loss of user-interface-associated motion. Some implementations determine which segments of a movement to associate with user interface content based on characteristics of the movement. Some implementations determine that a break occurs when a user movement leaves a break volume that is adjusted dynamically.

25 Claims, 7 Drawing Sheets

(56) References Cited

U.S. PATENT DOCUMENTS

| | | |
|---|---|---|
| 5,737,553 A | 4/1998 | Bartok |
| 5,740,440 A | 4/1998 | West |
| 5,751,287 A | 5/1998 | Hahn |
| 5,758,122 A | 5/1998 | Corda |
| 5,794,178 A | 8/1998 | Caid |
| 5,877,766 A | 3/1999 | Bates |
| 5,900,849 A | 5/1999 | Gallery |
| 5,933,143 A | 8/1999 | Kobayashi |
| 5,990,886 A | 11/1999 | Serdy |
| 6,061,060 A | 5/2000 | Berry |
| 6,108,004 A | 8/2000 | Medl |
| 6,112,015 A | 8/2000 | Planas |
| 6,154,559 A | 11/2000 | Beardsley |
| 6,456,296 B1 | 9/2002 | Cataudella |
| 6,584,465 B1 | 6/2003 | Zhu |
| 6,756,997 B1 | 6/2004 | Ward, III |
| 7,035,903 B1 | 4/2006 | Baldonado |
| 7,137,074 B1 | 11/2006 | Newton |
| 7,230,629 B2 | 6/2007 | Reynolds |
| 8,793,620 B2 | 7/2014 | Stafford |
| 8,803,873 B2 | 8/2014 | Yoo |
| 8,947,323 B1 | 2/2015 | Raffle |
| 8,970,478 B2 | 3/2015 | Johansson |
| 8,970,629 B2 | 3/2015 | Kim |
| 8,994,718 B2 | 3/2015 | Latta |
| 9,007,301 B1 | 4/2015 | Raffle et al. |
| 9,185,062 B1 | 11/2015 | Yang |
| 9,201,500 B2 | 12/2015 | Srinivasan et al. |
| 9,256,785 B2 | 2/2016 | Qvarfordt |
| 9,400,559 B2 | 7/2016 | Latta |
| 9,448,635 B2 | 9/2016 | Macdougall |
| 9,465,479 B2 | 10/2016 | Cho |
| 9,526,127 B1 | 12/2016 | Taubman et al. |
| 9,563,331 B2 | 2/2017 | Poulos |
| 9,575,559 B2 | 2/2017 | Andrysco |
| 9,681,112 B2 | 6/2017 | Son |
| 9,684,372 B2 | 6/2017 | Xun |
| 9,734,402 B2 | 8/2017 | Jang et al. |
| 9,778,814 B2 | 10/2017 | Ambrus |
| 9,851,866 B2 | 12/2017 | Goossens |
| 9,886,087 B1 | 2/2018 | Wald |
| 9,933,833 B2 | 4/2018 | Tu |
| 9,934,614 B2 | 4/2018 | Ramsby |
| 10,049,460 B2 | 8/2018 | Romano |
| 10,203,764 B2 | 2/2019 | Katz |
| 10,307,671 B2 | 6/2019 | Barney |
| 10,353,532 B1 | 7/2019 | Holz |
| 10,394,320 B2 | 8/2019 | George-Svahn et al. |
| 10,534,439 B2 | 1/2020 | Raffa |
| 10,664,048 B2 | 5/2020 | Cieplinski |
| 10,664,050 B2 | 5/2020 | Alcaide et al. |
| 10,699,488 B1 | 6/2020 | Terrano |
| 10,732,721 B1* | 8/2020 | Clements .............. B66B 1/468 |
| 10,754,434 B2 | 8/2020 | Hall |
| 10,768,693 B2 | 9/2020 | Powderly |
| 10,861,242 B2 | 12/2020 | Lacey et al. |
| 10,890,967 B2 | 1/2021 | Stellmach |
| 10,956,724 B1 | 3/2021 | Terrano |
| 10,983,663 B2 | 4/2021 | Iglesias |
| 11,055,920 B1 | 7/2021 | Bramwell |
| 11,112,875 B1 | 9/2021 | Zhou et al. |
| 11,199,898 B2 | 12/2021 | Blume et al. |
| 11,200,742 B1 | 12/2021 | Post |
| 11,262,840 B2 | 3/2022 | Bychkov et al. |
| 11,294,472 B2 | 4/2022 | Tang et al. |
| 11,294,475 B1 | 4/2022 | Pinchon |
| 11,340,756 B2* | 5/2022 | Faulkner .............. G06T 15/00 |
| 11,348,300 B2 | 5/2022 | Zimmermann |
| 11,461,973 B2 | 10/2022 | Pinchon |
| 11,573,363 B2 | 2/2023 | Zou et al. |
| 11,573,631 B2 | 2/2023 | Cederlund et al. |
| 11,574,452 B2 | 2/2023 | Berliner et al. |
| 11,720,171 B2 | 8/2023 | Pastrana Vicente et al. |
| 11,726,577 B2 | 8/2023 | Katz |
| 11,733,824 B2 | 8/2023 | Iskandar |
| 11,762,457 B1 | 9/2023 | Ikkai |
| 12,099,653 B2 | 9/2024 | Chawda |
| 12,118,200 B1 | 10/2024 | Shutzberg |
| 2001/0047250 A1 | 11/2001 | Schuller |
| 2002/0044152 A1 | 4/2002 | Abbott |
| 2003/0151611 A1 | 8/2003 | Turpin |
| 2003/0222924 A1 | 12/2003 | Baron |
| 2004/0059784 A1 | 3/2004 | Caughey |
| 2004/0243926 A1 | 12/2004 | Trenbeath |
| 2005/0100210 A1 | 5/2005 | Rice |
| 2005/0138572 A1 | 6/2005 | Good |
| 2005/0144570 A1 | 6/2005 | Loverin |
| 2005/0144571 A1 | 6/2005 | Loverin |
| 2005/0198143 A1 | 9/2005 | Moody |
| 2006/0080702 A1 | 4/2006 | Diez |
| 2008/0211771 A1 | 9/2008 | Richardson |
| 2009/0064035 A1 | 3/2009 | Shibata |
| 2009/0231356 A1 | 9/2009 | Barnes |
| 2010/0097375 A1 | 4/2010 | Tadaishi |
| 2010/0150526 A1 | 6/2010 | Rose |
| 2010/0188503 A1 | 7/2010 | Tsai |
| 2011/0018895 A1 | 1/2011 | Buzyn |
| 2011/0018896 A1 | 1/2011 | Buzyn |
| 2011/0216060 A1 | 9/2011 | Weising |
| 2011/0254865 A1 | 10/2011 | Yee |
| 2011/0310001 A1 | 12/2011 | Madau |
| 2012/0086624 A1 | 4/2012 | Thompson |
| 2012/0113223 A1 | 5/2012 | Hilliges |
| 2012/0151416 A1 | 6/2012 | Bell |
| 2012/0170840 A1 | 7/2012 | Caruso |
| 2012/0218395 A1 | 8/2012 | Andersen |
| 2012/0257035 A1 | 10/2012 | Larsen |
| 2013/0127850 A1 | 5/2013 | Bindon |
| 2013/0154913 A1 | 6/2013 | Genc et al. |
| 2013/0211843 A1 | 8/2013 | Clarkson |
| 2013/0229345 A1 | 9/2013 | Day |
| 2013/0271397 A1 | 10/2013 | Macdougall |
| 2013/0278501 A1 | 10/2013 | Bulzacki |
| 2013/0283213 A1 | 10/2013 | Guendelman et al. |
| 2013/0286004 A1 | 10/2013 | Mcculloch |
| 2013/0307775 A1 | 11/2013 | Raynor |
| 2013/0326364 A1 | 12/2013 | Latta |
| 2013/0342564 A1 | 12/2013 | Kinnebrew |
| 2013/0342570 A1 | 12/2013 | Kinnebrew |
| 2014/0002338 A1 | 1/2014 | Raffa |
| 2014/0028548 A1 | 1/2014 | Bychkov |
| 2014/0075361 A1 | 3/2014 | Reynolds |
| 2014/0078176 A1 | 3/2014 | Kim |
| 2014/0108942 A1 | 4/2014 | Freeman |
| 2014/0125584 A1 | 5/2014 | Xun |
| 2014/0184496 A1* | 7/2014 | Gribetz .............. G02B 27/017 |
| | | 345/156 |
| 2014/0184644 A1 | 7/2014 | Sharma |
| 2014/0198017 A1 | 7/2014 | Lamb |
| 2014/0258942 A1 | 9/2014 | Kutliroff et al. |
| 2014/0282272 A1 | 9/2014 | Kies |
| 2014/0320404 A1 | 10/2014 | Kasahara |
| 2014/0347391 A1 | 11/2014 | Keane |
| 2015/0035822 A1 | 2/2015 | Arsan |
| 2015/0035832 A1 | 2/2015 | Sugden |
| 2015/0042679 A1 | 2/2015 | Järvenpää |
| 2015/0067580 A1 | 3/2015 | Um |
| 2015/0123890 A1 | 5/2015 | Kapur |
| 2015/0153833 A1 | 6/2015 | Pinault et al. |
| 2015/0177937 A1 | 6/2015 | Poletto |
| 2015/0187093 A1 | 7/2015 | Chu |
| 2015/0205106 A1 | 7/2015 | Norden |
| 2015/0220152 A1 | 8/2015 | Tait et al. |
| 2015/0227285 A1 | 8/2015 | Lee |
| 2015/0242095 A1 | 8/2015 | Sonnenberg |
| 2015/0317832 A1 | 11/2015 | Ebstyne |
| 2015/0331576 A1 | 11/2015 | Piya |
| 2015/0332091 A1 | 11/2015 | Kim |
| 2015/0370323 A1 | 12/2015 | Cieplinski |
| 2016/0015470 A1 | 1/2016 | Border |
| 2016/0018898 A1 | 1/2016 | Tu |
| 2016/0018900 A1 | 1/2016 | Tu |
| 2016/0026242 A1 | 1/2016 | Burns |
| 2016/0026253 A1 | 1/2016 | Bradski |

(56) References Cited

U.S. PATENT DOCUMENTS

| | | |
|---|---|---|
| 2016/0062636 A1 | 3/2016 | Jung |
| 2016/0093108 A1 | 3/2016 | Mao |
| 2016/0098094 A1* | 4/2016 | Minkkinen ......... G06F 3/04883 345/156 |
| 2016/0171304 A1 | 6/2016 | Golding |
| 2016/0179336 A1 | 6/2016 | Ambrus |
| 2016/0196692 A1 | 7/2016 | Kjallstrom |
| 2016/0239080 A1 | 8/2016 | Marcolina et al. |
| 2016/0253063 A1 | 9/2016 | Critchlow |
| 2016/0253821 A1 | 9/2016 | Romano |
| 2016/0275702 A1 | 9/2016 | Reynolds |
| 2016/0306434 A1 | 10/2016 | Ferrin |
| 2016/0313890 A1 | 10/2016 | Walline |
| 2016/0334875 A1* | 11/2016 | Kandadai ............ G02B 27/017 |
| 2016/0379409 A1 | 12/2016 | Gavriliuc |
| 2017/0038829 A1 | 2/2017 | Lanier |
| 2017/0038837 A1 | 2/2017 | Faaborg |
| 2017/0038849 A1 | 2/2017 | Hwang |
| 2017/0039770 A1 | 2/2017 | Lanier |
| 2017/0046872 A1 | 2/2017 | Geselowitz |
| 2017/0060230 A1 | 3/2017 | Faaborg |
| 2017/0123487 A1 | 5/2017 | Hazra |
| 2017/0131964 A1 | 5/2017 | Baek |
| 2017/0132694 A1 | 5/2017 | Damy |
| 2017/0132822 A1 | 5/2017 | Marschke |
| 2017/0153866 A1 | 6/2017 | Grinberg |
| 2017/0206691 A1 | 7/2017 | Harrises et al. |
| 2017/0228130 A1 | 8/2017 | Palmaro |
| 2017/0285737 A1 | 10/2017 | Khalid |
| 2017/0315715 A1 | 11/2017 | Fujita |
| 2017/0344223 A1 | 11/2017 | Holzer |
| 2017/0358141 A1 | 12/2017 | Stafford |
| 2018/0045963 A1 | 2/2018 | Hoover et al. |
| 2018/0059928 A1 | 3/2018 | Westerman et al. |
| 2018/0075658 A1 | 3/2018 | Lanier |
| 2018/0081519 A1 | 3/2018 | Kim |
| 2018/0095634 A1 | 4/2018 | Alexander |
| 2018/0095635 A1 | 4/2018 | Valdivia |
| 2018/0101223 A1* | 4/2018 | Ishihara ............ G02B 27/0172 |
| 2018/0114364 A1 | 4/2018 | Mcphee |
| 2018/0150997 A1 | 5/2018 | Austin |
| 2018/0158222 A1 | 6/2018 | Hayashi |
| 2018/0181199 A1 | 6/2018 | Harvey |
| 2018/0188802 A1 | 7/2018 | Okumura |
| 2018/0210628 A1 | 7/2018 | Mcphee |
| 2018/0239144 A1 | 8/2018 | Woods |
| 2018/0300023 A1 | 10/2018 | Hein |
| 2018/0315248 A1 | 11/2018 | Bastov |
| 2018/0322701 A1 | 11/2018 | Pahud |
| 2018/0348861 A1 | 12/2018 | Uscinski |
| 2019/0034076 A1 | 1/2019 | Fnu |
| 2019/0050062 A1 | 2/2019 | Chen |
| 2019/0073109 A1 | 3/2019 | Zhang |
| 2019/0080572 A1 | 3/2019 | Kim |
| 2019/0088149 A1 | 3/2019 | Fink |
| 2019/0094963 A1 | 3/2019 | Nijs |
| 2019/0094979 A1 | 3/2019 | Hall |
| 2019/0101991 A1 | 4/2019 | Brennan |
| 2019/0130633 A1 | 5/2019 | Haddad |
| 2019/0130733 A1 | 5/2019 | Hodge |
| 2019/0146128 A1 | 5/2019 | Cao |
| 2019/0204906 A1 | 7/2019 | Ross |
| 2019/0227763 A1 | 7/2019 | Kaufthal |
| 2019/0258365 A1 | 8/2019 | Zurmoehle |
| 2019/0310757 A1 | 10/2019 | Lee |
| 2019/0324529 A1 | 10/2019 | Stellmach |
| 2019/0339770 A1 | 11/2019 | Kurlethimar |
| 2019/0346922 A1 | 11/2019 | Young |
| 2019/0362557 A1 | 11/2019 | Lacey |
| 2019/0371072 A1 | 12/2019 | Lindberg |
| 2019/0377487 A1 | 12/2019 | Bailey |
| 2019/0379765 A1 | 12/2019 | Fajt |
| 2019/0384406 A1 | 12/2019 | Smith |
| 2020/0004401 A1* | 1/2020 | Hwang ............... G06F 3/04815 |
| 2020/0012341 A1 | 1/2020 | Stellmach |
| 2020/0043243 A1 | 2/2020 | Bhushan |
| 2020/0082602 A1 | 3/2020 | Jones |
| 2020/0089314 A1 | 3/2020 | Poupyrev |
| 2020/0098140 A1 | 3/2020 | Jagnow |
| 2020/0098173 A1 | 3/2020 | Mccall |
| 2020/0117213 A1 | 4/2020 | Tian |
| 2020/0129850 A1 | 4/2020 | Ohashi |
| 2020/0159017 A1 | 5/2020 | Lin |
| 2020/0225747 A1 | 7/2020 | Bar-Zeev |
| 2020/0225830 A1 | 7/2020 | Tang |
| 2020/0226814 A1 | 7/2020 | Tang |
| 2020/0356221 A1 | 11/2020 | Behzadi |
| 2020/0357374 A1 | 11/2020 | Verweij |
| 2020/0387228 A1 | 12/2020 | Ravasz |
| 2021/0064142 A1 | 3/2021 | Stern et al. |
| 2021/0074062 A1 | 3/2021 | Madonna |
| 2021/0090337 A1 | 3/2021 | Ravasz |
| 2021/0096726 A1 | 4/2021 | Faulkner |
| 2021/0141525 A1 | 5/2021 | Piemonte et al. |
| 2021/0191600 A1 | 6/2021 | Lemay et al. |
| 2021/0295602 A1 | 9/2021 | Scapel |
| 2021/0303074 A1 | 9/2021 | Vanblon |
| 2021/0319617 A1 | 10/2021 | Ahn |
| 2021/0327140 A1 | 10/2021 | Rothkopf |
| 2021/0339134 A1 | 11/2021 | Knoppert |
| 2021/0350564 A1 | 11/2021 | Peuhkurinen |
| 2021/0357073 A1 | 11/2021 | Kandadai et al. |
| 2021/0374443 A1 | 12/2021 | Edwards |
| 2021/0375022 A1 | 12/2021 | Lee |
| 2022/0011855 A1 | 1/2022 | Hazra |
| 2022/0030197 A1 | 1/2022 | Ishimoto |
| 2022/0083197 A1 | 3/2022 | Rockel |
| 2022/0092862 A1 | 3/2022 | Faulkner |
| 2022/0101593 A1 | 3/2022 | Rockel |
| 2022/0101612 A1 | 3/2022 | Palangie |
| 2022/0104910 A1 | 4/2022 | Shelton, IV et al. |
| 2022/0121344 A1 | 4/2022 | Pastrana Vicente et al. |
| 2022/0130107 A1 | 4/2022 | Lindh |
| 2022/0137705 A1 | 5/2022 | Hashimoto |
| 2022/0157083 A1 | 5/2022 | Jandhyala |
| 2022/0187907 A1 | 6/2022 | Lee et al. |
| 2022/0191570 A1 | 6/2022 | Reid |
| 2022/0229524 A1 | 7/2022 | McKenzie et al. |
| 2022/0229534 A1 | 7/2022 | Terre |
| 2022/0236795 A1 | 7/2022 | Jonker |
| 2022/0245888 A1 | 8/2022 | Singh |
| 2022/0253149 A1 | 8/2022 | Berliner |
| 2022/0276720 A1 | 9/2022 | Yasui |
| 2022/0326837 A1 | 10/2022 | Dessero |
| 2022/0413691 A1 | 12/2022 | Becker |
| 2022/0414999 A1 | 12/2022 | Ravasz |
| 2023/0004216 A1 | 1/2023 | Rodgers et al. |
| 2023/0008537 A1 | 1/2023 | Henderson |
| 2023/0068660 A1 | 3/2023 | Brent |
| 2023/0069764 A1 | 3/2023 | Jonker |
| 2023/0074080 A1 | 3/2023 | Miller |
| 2023/0093979 A1 | 3/2023 | Stauber |
| 2023/0133579 A1 | 5/2023 | Yuhu |
| 2023/0152935 A1 | 5/2023 | Mckenzie |
| 2023/0154122 A1 | 5/2023 | Dascola |
| 2023/0163987 A1 | 5/2023 | Young |
| 2023/0168788 A1 | 6/2023 | Faulkner et al. |
| 2023/0185426 A1 | 6/2023 | Rockel et al. |
| 2023/0186577 A1 | 6/2023 | Rockel et al. |
| 2023/0244316 A1 | 8/2023 | Schwarz |
| 2023/0244857 A1 | 8/2023 | Weiss |
| 2023/0273706 A1 | 8/2023 | Smith |
| 2023/0274504 A1 | 8/2023 | Ren |
| 2023/0305635 A1 | 9/2023 | Han |
| 2023/0308610 A1 | 9/2023 | Henderson |
| 2023/0315385 A1 | 10/2023 | Akmal |
| 2023/0316634 A1 | 10/2023 | Shih-Sang |
| 2023/0325004 A1 | 10/2023 | Burns |
| 2023/0350539 A1 | 11/2023 | Owen |
| 2023/0384907 A1 | 11/2023 | Boesel |
| 2024/0086031 A1 | 3/2024 | Palangie |
| 2024/0086032 A1 | 3/2024 | Palangie |
| 2024/0087256 A1 | 3/2024 | Hylak |
| 2024/0094863 A1 | 3/2024 | Smith |

(56) References Cited

U.S. PATENT DOCUMENTS

| | | |
|---|---|---|
| 2024/0095984 A1 | 3/2024 | Ren |
| 2024/0103613 A1 | 3/2024 | Chawda |
| 2024/0103684 A1 | 3/2024 | Yu |
| 2024/0103707 A1 | 3/2024 | Henderson |
| 2024/0104836 A1 | 3/2024 | Dessero |
| 2024/0104877 A1 | 3/2024 | Henderson |
| 2024/0111479 A1 | 4/2024 | Paul |
| 2024/0221291 A1 | 7/2024 | Henderson |
| 2024/0393876 A1 | 11/2024 | Chawda |
| 2024/0402800 A1 | 12/2024 | Shutzberg |
| 2024/0402821 A1 | 12/2024 | Meyer |
| 2024/0411444 A1 | 12/2024 | Shutzberg |

FOREIGN PATENT DOCUMENTS

| | | |
|---|---|---|
| CN | 105264461 A | 1/2016 |
| CN | 105264478 A | 1/2016 |
| CN | 108633307 A | 10/2018 |
| CN | 109491508 B | 3/2019 |
| CN | 110476142 A | 11/2019 |
| CN | 110673718 A | 1/2020 |
| EP | 2741175 A2 | 6/2014 |
| EP | 2947545 A1 | 11/2015 |
| EP | 3503101 A1 | 6/2019 |
| EP | 3588255 A1 | 1/2020 |
| EP | 3654147 A1 | 5/2020 |
| JP | H1051711 A | 2/1998 |
| JP | 2005215144 A | 8/2005 |
| JP | 2012234550 A | 11/2012 |
| JP | 2013196158 A | 9/2013 |
| JP | 2013257716 A | 12/2013 |
| JP | 2014514652 A | 6/2014 |
| JP | 2015515040 A | 5/2015 |
| JP | 2015118332 A | 6/2015 |
| JP | 2016194744 A | 11/2016 |
| JP | 2017027206 A | 2/2017 |
| JP | 2018005516 A | 1/2018 |
| JP | 2019169154 A | 10/2019 |
| JP | 2022053334 A | 4/2022 |
| KR | 20160012139 A | 2/2016 |
| KR | 20190100957 A | 8/2019 |
| WO | 2019142560 A1 | 7/2019 |
| WO | 2019217163 A1 | 11/2019 |
| WO | 2020066682 A1 | 4/2020 |
| WO | 2021173839 A1 | 9/2021 |
| WO | 2021202783 A1 | 10/2021 |
| WO | 2022055822 A1 | 3/2022 |
| WO | 2022066399 A1 | 3/2022 |
| WO | WO 2022046340 | 3/2022 |
| WO | WO2022164881 | 4/2022 |
| WO | 2023141535 A1 | 7/2023 |

OTHER PUBLICATIONS

European Patent Office, European Search Report, European Patent Application No. 24179233.2, 10 pages, Oct. 2, 2024.
European Patent Office, Search Report received for European Patent Application No. 21801378.7, 5 pages, Jul. 10, 2024.
U.S. Patent and Trademark Office, Non-Final Office Action received for U.S. Appl. No. 18/305,201, 11 pages, May 23, 2024.
U.S. Patent and Trademark Office, Notice of Allowance received for U.S. Appl. No. 17/448,875, 8 pages, Jul. 12, 2024.
U.S. Patent and Trademark Office, Notice of Allowance received for U.S. Appl. No. 17/659,147, 13 pages, May 29, 2024.
U.S. Patent and Trademark Office, Notice of Allowance received for U.S. Appl. No. 18/421,675, 8 pages, Jul. 31, 2024.
U.S. Patent and Trademark Office, Notice of Allowance received for U.S. Appl. No. 18/423,187, 9 pages, Jun. 5, 2024.
U.S. Patent and Trademark Office, Notice of Allowance received for U.S. Appl. No. 18/463,739, 9 pages, Jun. 17, 2024.
U.S. Patent and Trademark Office, Notice of Allowance received for U.S. Appl. No. 18/465,098, 8 pages, Jun. 20, 2024.
U.S. Patent and Trademark Office, Non-Final Office Action, U.S. Appl. No. 18/244,570, 33 pages, May 29, 2024.
U.S. Patent and Trademark Office, Corrected Notice of Allowability received for U.S. Appl. No. 17/448,875, 4 pages, Apr. 24, 2024.
U.S. Patent and Trademark Office, Corrected Notice of Allowability received for U.S. Appl. No. 17/659,147, 6 pages, Feb. 14, 2024.
U.S. Patent and Trademark Office, Corrected Notice of Allowability received for U.S. Appl. No. 17/932,655, 2 pages, Oct. 12, 2023.
U.S. Patent and Trademark Office, Corrected Notice of Allowability received for U.S. Appl. No. 18/465,098, 3 pages, Mar. 13, 2024.
European Patent Office, European Search Report received for European Patent Application No. 21791153.6, 5 pages, Mar. 22, 2024.
European Patent Office, Extended European Search Report received for European Patent Application No. 23197572.3, 7 pages, Feb. 19, 2024.
U.S. Patent and Trademark Office, Final Office Action received for U.S. Appl. No. 17/580,495, 29 pages, May 13, 2024.
U.S. Patent and Trademark Office, Final Office Action received for U.S. Appl. No. 17/659,147, 17 pages, Oct. 4, 2023.
European Patent Office (ISA/EP), International Search Report received for International Patent Application No. PCT/US2021/071596, 7 pages, Apr. 8, 2022.
European Patent Office (ISA/EP), International Search Report received for International Patent Application No. PCT/US2022/071704, 6 pages, Aug. 26, 2022.
European Patent Office (ISA/EP), International Search Report received for PCT Patent Application No. PCT/US2023/074257, 5 pages, Nov. 21, 2023.
European Patent Office (ISA/EP), International Search Report received for International Patent Application No. PCT/US2023/074950, 9 pages, Jan. 3, 2024.
European Patent Office (ISA/EP), International Search Report received for International Patent Application No. PCT/US2023/074979, 6 pages, Feb. 26, 2024.
U.S. Patent and Trademark Office, Non-Final Office Action received for U.S. Appl. No. 17/659,147, 19 pages, Mar. 16, 2023.
U.S. Patent and Trademark Office, Non-Final Office Action received for U.S. Appl. No. 17/932,655, 10 pages, Apr. 20, 2023.
U.S. Patent and Trademark Office, Non-Final Office Action received for U.S. Appl. No. 17/932,999, 22 pages, Feb. 23, 2024.
U.S. Patent and Trademark Office, Non-Final Office Action received for U.S. Appl. No. 18/157,040, 25 pages, May 2, 2024.
U.S. Patent and Trademark Office, Notice of Allowance received for U.S. Appl. No. 17/448,875, 8 pages, Apr. 17, 2024.
U.S. Patent and Trademark Office, Notice of Allowance received for U.S. Appl. No. 17/448,876, 9 pages, Apr. 7, 2022.
U.S. Patent and Trademark Office, Notice of Allowance received for U.S. Appl. No. 17/448,876, 8 pages, Jul. 20, 2022.
U.S. Patent and Trademark Office, Notice of Allowance received for U.S. Appl. No. 17/659,147, 13 pages, Jan. 26, 2024.
U.S. Patent and Trademark Office, Notice of Allowance received for U.S. Appl. No. 17/932,655, 7 pages, Jan. 24, 2024.
U.S. Patent and Trademark Office, Notice of Allowance received for U.S. Appl. No. 17/932,655, 7 pages, Sep. 29, 2023.
U.S. Patent and Trademark Office, Notice of Allowance received for U.S. Appl. No. 18/154,757, 12 pages, May 10, 2024.
U.S. Patent and Trademark Office, Notice of Allowance received for U.S. Appl. No. 18/421,675, 9 pages, Apr. 11, 2024.
U.S. Patent and Trademark Office, Notice of Allowance received for U.S. Appl. No. 18/463,739, 10 pages, Feb. 1, 2024.
U.S. Patent and Trademark Office, Notice of Allowance received for U.S. Appl. No. 18/463,739, 11 pages, Oct. 30, 2023.
U.S. Patent and Trademark Office, Notice of Allowance received for U.S. Appl. No. 18/465,098, 6 pages, Mar. 4, 2024.
U.S. Patent and Trademark Office, Notice of Allowance received for U.S. Appl. No. 18/465,098, 8 pages, Nov. 17, 2023.
National Intellectual Property Administration of the People's Republic of China, Search Report (with English translation) received for Chinese Patent Application No. 202310873465.7, 5 pages, Feb. 1, 2024.

(56) References Cited

OTHER PUBLICATIONS

European Patent Office, International Search Report issued Dec. 21, 2021, which pertains to PCT Application No. PCT/US2021/049131, filed Sep. 3, 2021. 4 pgs.
European Patent Office, Written Opinion issued Dec. 21, 2021, which pertains to PCT Application No. PCT/US2021/049131, filed Sep. 3, 2021. 9 pgs.
"AquaSnap Window Manager: dock, snap, tile, organize," Nurgo Software, Available online at: https://www.nurgo-software.com/products/aquasnap, 5 pages, retrieved on Jun. 27, 2023.
United States Patent and Trademark Office, Corrected Notice of Allowance, U.S. Appl. No. 17/478,593, 2 pages, Dec. 21, 2022.
European Patent Office, Extended European Search Report, European Patent Application No. 23158818.7, 12 pages, Jul. 3, 2023.
European Patent Office, Extended European Search Report, European Patent Application No. 23158929.2, 12 pages, Jun. 27, 2023.
U.S. Patent and Trademark Office, Final Office Action, U.S. Appl. No. 17/448,875, 24 pages, Mar. 16, 2023.
Home | Virtual Desktop, Virtual Desktop, https://www.vrdesktop.net, 4 pages, retrieved Jun. 29, 2023.
European Patent Office (ISA/EP), International Search Report, International Application No. PCT/US2022/076603, 4 pages, Jan. 9, 2023.
European Patent Office (ISA/EP), International Search Report, International Application No. PCT/US2023/017335, 6 pages, Aug. 22, 2023.
European Patent Office (ISA/EP), International Application No. Application No. PCT/US2023/018213, 6 pages, Jul. 26, 2023.
European Patent Office (ISA/EP), International Application No. PCT/US2023/019458, 7 pages, Aug. 8, 2023.
European Patent Office (ISA/EP), International Search Report, International Application No. PCT/US2023/060943, 7 pages, Jun. 6, 2023.
European Patent Office (ISA/EP), International Search Report, International Application No. PCT/US2021/050948, 6 pages, Mar. 4, 2022.
European Patent Office. International Search Report, International Application No. PCT/US2021/065240, 6 pages, May 23, 2022.
European Patent Office, International Search Report, International Application No. PCT/US2021/071595, 7 pages, Mar. 17, 2022.
European Patent Office, International Search Report, International Application No. PCT/US2022/013208, 7 pages, Apr. 26, 2022.
European Patent Office, International Search Report, International Application No. PCT/US2021/065242, 3 pages, Apr. 4, 2022.
U.S. Patent and Trademark Office, Non-Final Office Action, U.S. Appl. No. 17/448,875, 25 pages, Oct. 6, 2022.
U.S. Patent and Trademark Office, Non-Final Office Action, U.S. Appl. No. 17/448,875, 30 pages, Sep. 29, 2023.
U.S. Patent and Trademark Office, Non-Final Office Action, U.S. Appl. No. 17/580,495, 27 pages, Dec. 11, 2023.
U.S. Patent and Trademark Office, Notice of Allowance, U.S. Appl. No. 17/478,593,, 10 pages, Aug. 31, 2022.
U.S. Patent and Trademark Office, Notice of Allowance, U.S. Appl. No. 17/580,495,, 6 pages, Jun. 6, 2023.
U.S. Patent and Trademark Office, Notice of Allowance, U.S. Appl. No. 17/580,495, 12 pages, Nov. 30, 2022.
U.S. Patent and Trademark Office, Notice of Allowance, U.S. Appl. No. 18/154,757, 10 pages, Jan. 23, 2024.
U.S. Patent and Trademark Office, Restriction Requirement, U.S. Appl. No. 17/932,999, 6 pages, Oct. 3, 2023.
Bhowmick, S, "Explorations on Body-Gesture Based Object Selection on HMD Based VR Interfaces for Dense and Occluded Dense Virtual Environments," Report: State of the Art Seminar, Department of Design Indian Institute of Technology, Guwahati, 25 pages, Nov. 2018.
Bolt, R.A. et al.,, "Two-Handed Gesture in Multi-Modal Natural Dialog," Uist '92, 5th Annual Symposium on User Interface Software And Technology. Proceedings Of the ACM Symposium on User Interface Software And Technology, Monterey, pp. 7-14, Nov. 1992.
Brennan, D., "4 Virtual Reality Desktops for Vive, Rift, and Windows VR Compared," Road to VR, Available online at: https://www.roadtovr.com/virtual-reality-desktop-compared-oculus-rift-htc-vive/, retrieved on Jun. 29, 2023.
Camalich, S., "CSS Buttons with Pseudo-elements," available online at: https://tympanus.net/codrops/2012/01/11/css-buttons-with-pseudo-elements/, 8 pages, retrieved on Jul. 12, 2017.
Chatterjee, I. et al., "Gaze+Gesture: Expressive, Precise and Targeted Free-Space Interactions," ICMI '15, 8 pages, 2015.
Lin, J. et al., "Towards Naturally Grabbing and Moving Objects in VR," IS&T International Symposium on Electronic Imaging and The Engineering Reality of Virtual Reality, 6 pages, 2016.
McGill, M. et al., "Expanding The Bounds Of Seated Virtual Workspaces," University of Glasgow, Available online at: https://core.ac.uk/download/pdf/323988271.pdf, 44 pages, retrieved on Jun. 27, 2023.
Pfeiffer, K. et al., "Gaze + Pinch Interaction in Virtual Reality," In Proceedings of SUI '17, Brighton, United Kingdom, pp. 99-108, 2017.
European Patent Office, European Search Report, European Patent Application No. 24178730.8, 8 pages, Oct. 14, 2024.
European Patent Office, European Search Report, European Patent Application No. 24178752.2, 8 pages, Oct. 4, 2024.
U.S. Patent and Trademark Office, Non-Final Office Action, U.S. Appl. No. 18/375,260, 11 pages, Nov. 24, 2023.

\* cited by examiner

INTERPRETING USER MOVEMENT AS DIRECT TOUCH USER INTERFACE INTERACTIONS

CROSS-REFERENCE TO RELATED APPLICATIONS

This application claims the benefit of U.S. Provisional Application Ser. No. 63/409,326 filed Sep. 23, 2022, which is incorporated herein in its entirety.

TECHNICAL FIELD

The present disclosure generally relates to assessing user interactions with electronic devices that involve hand and body movements.

BACKGROUND

Existing user interaction systems may be improved with respect to facilitating interactions based on user hand and body movements and other activities.

SUMMARY

Various implementations disclosed herein include devices, systems, and methods that interpret direct touch-based gestures, such as drag and swipe gestures, made by a user virtually touching one position of a user interface and, while still touching, moving their hand to another position of the user interface (UI). Such gestures may be made relative to a user interface presented as virtual content in the 3D space of an extended reality (XR) environment. Ideally such gestures would be associated with user interface positions based on where the user's hand virtually intersects the user interface, e.g., where the hand makes contact and breaks contact with the user interface. However, because a user's perception of when and where the user is virtually touching the user interface (e.g., overlapping the user interface in an extended reality (XR) space) may be inaccurate, unexpected gain or loss of user interface-associated motion (referred to as "hooking") may occur. For example, a segment of the user's movement may be associated with user interface contact when the user expects the segment of movement to not occur during user interface contact. Conversely, a segment of the user's movement may not be associated with user interface contact when the user expects the segment of movement to occur during user interface contact.

Some implementations determine which segments of a movement to associate with user interface content based on characteristics of the movement. In drags (i.e., where a user attempts to touch at a position on the user interface move to a second position on the user interface and release the touch at that second position), hooking can occur when a segment of the movement associated with retracting the hand is associated with UI contact, in contrast to the user's expectation that such retracting would not occur during UI contact. This may cause the system to identify an incorrect break point on the user interface, i.e., using the retraction portion of the movement to identify the break point rather than the position on the user interface corresponding to the user's position when the intentional UI-contacting motion ceased. Some implementations avoid such erroneous associations (and thus more accurately interpret movements) by determining whether to associate such a segment (e.g., a potential retraction segment) based on whether the characteristics of the segment are indicative of a retraction. In other words, some implementations determine that a segment of a movement that would otherwise be associated with user interface content (e.g., based on actual position overlap) should not associated be associated with user interface contact if the segment of the motion is likely to be a retraction. This may involve determining to not associate a segment of motion with user interface contact based on determining that the segment is a likely to be a retraction based on assessing how aligned the segment is with a retraction axis, a significance of a retraction direction change, or a motion stop.

In some implementations, a processor performs a method by executing instructions stored on a computer readable medium. The method displays an XR environment corresponding to a 3D environment, where the XR environment comprises a user interface and a movement (e.g., of a user's finger or hand). The method determines whether each of multiple segments of the movement has a characteristic that satisfies a retraction criterion. The retraction criterion is configured to distinguish retraction motion from another type of motion. As examples, the characteristic may be, but is not limited to being, (a) a measure of alignment between the movement direction during the respective segment and a retraction direction (b) a measure how quickly movement direction changes and/or (c) whether the user (e.g., hand/finger) has stopped moving. The method associates a subset of the segments of the movement with user interface contact based on whether the characteristic of each of the segments satisfies the retraction criterion. In some implementations, the association of select segments is achieved by implementing a retraction dead-band such that movement occurring during the retraction (because such movement is within the retraction dead-band) is not recognized as user interface contact motion.

In some implementations, user movement is interpreted using a technique that avoids unexpected gain or loss of UI-associated motion using a dynamic break volume. Some implementations determine that a break occurs when a user movement leaves a break volume that is adjusted dynamically based on retraction confidence and/or piercing depth. Intentional swipe momentum may be preserved by breaking at an appropriate time before motion is lost from an arc or retraction.

In some implementations, a processor performs a method by executing instructions stored on a computer readable medium. The method displays an XR environment corresponding to a 3D environment, where the XR environment comprises a user interface and a movement. The method adjusts a break volume based on the movement, the break volume defining a region of the XR environment in which the movement will be associated with user interface contact. In some examples, the break volume is positionally shifted based on retraction confidence. In some implementations, a slope or other shape attribute of the break volume is adjusted based on a piercing depth. The method determines to discontinue associating the movement with user interface contact (e.g., determining that a break event has occurred) based on the movement crossing a boundary of the break volume.

In accordance with some implementations, a device includes one or more processors, a non-transitory memory, and one or more programs; the one or more programs are stored in the non-transitory memory and configured to be executed by the one or more processors and the one or more programs include instructions for performing or causing performance of any of the methods described herein. In accordance with some implementations, a non-transitory computer readable storage medium has stored therein instructions, which, when executed by one or more processors of a device, cause the device to perform or cause performance of any of the methods described herein. In accordance with some implementations, a device includes: one or more processors, a non-transitory memory, and means for performing or causing performance of any of the methods described herein.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

Figure 1:
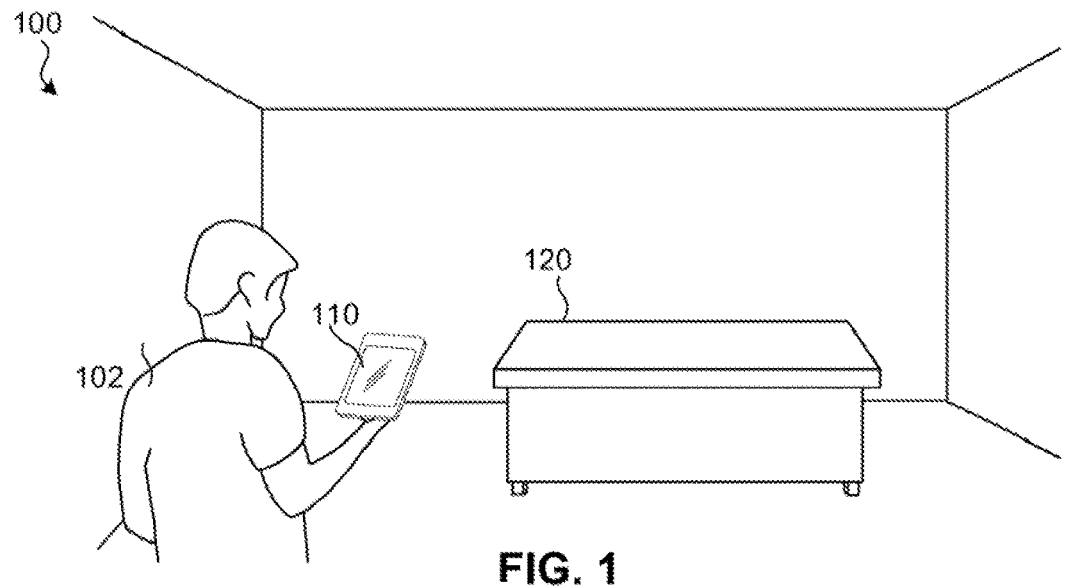
FIG. 1 illustrates an exemplary electronic device operating in a physical environment in accordance with some implementations.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DESCRIPTION

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices and circuits have not been described in exhaustive detail so as not to obscure more pertinent aspects of the example implementations described herein.

FIG. 1 illustrates an exemplary electronic device 110 operating in a physical environment 100. In this example of FIG. 1, the physical environment 100 is a room that includes a desk 120. The electronic device 110 includes one or more cameras, microphones, depth sensors, or other sensors that can be used to capture information about and evaluate the physical environment 100 and the objects within it, as well as information about the user 102 of the electronic device 110. The information about the physical environment 100 and/or user 102 may be used to provide visual and audio content and/or to identify the current location of the physical environment 100 and/or the location of the user within the physical environment 100.

In some implementations, views of an extended reality (XR) environment may be provided to one or more participants (e.g., user 102 and/or other participants not shown). Such an XR environment may include views of a 3D environment that is generated based on camera images and/or depth camera images of the physical environment 100 as well as a representation of user 102 based on camera images and/or depth camera images of the user 102. Such an XR environment may include virtual content that is positioned at 3D locations relative to a 3D coordinate system associated with the XR environment, which may correspond to a 3D coordinate system of the physical environment 100.

People may sense or interact with a physical environment or world without using an electronic device. Physical features, such as a physical object or surface, may be included within a physical environment. For instance, a physical environment may correspond to a physical city having physical buildings, roads, and vehicles. People may directly sense or interact with a physical environment through various means, such as smell, sight, taste, hearing, and touch. This can be in contrast to an extended reality (XR) environment that may refer to a partially or wholly simulated environment that people may sense or interact with using an electronic device. The XR environment may include virtual reality (VR) content, mixed reality (MR) content, augmented reality (AR) content, or the like. Using an XR system, a portion of a person's physical motions, or representations thereof, may be tracked and, in response, properties of virtual objects in the XR environment may be changed in a way that complies with at least one law of nature. For example, the XR system may detect a user's head movement and adjust auditory and graphical content presented to the user in a way that simulates how sounds and views would change in a physical environment. In other examples, the XR system may detect movement of an electronic device (e.g., a laptop, tablet, mobile phone, or the like) presenting the XR environment. Accordingly, the XR system may adjust auditory and graphical content presented to the user in a way that simulates how sounds and views would change in a physical environment. In some instances, other inputs, such as a representation of physical motion (e.g., a voice command), may cause the XR system to adjust properties of graphical content.

Numerous types of electronic systems may allow a user to sense or interact with an XR environment. A non-exhaustive list of examples includes lenses having integrated display capability to be placed on a user's eyes (e.g., contact lenses), heads-up displays (HUDs), projection-based systems, head mountable systems, windows or windshields having integrated display technology, headphones/earphones, input systems with or without haptic feedback (e.g., handheld or wearable controllers), smartphones, tablets, desktop/laptop computers, and speaker arrays. Head mountable systems may include an opaque display and one or more speakers. Other head mountable systems may be configured to receive an opaque external display, such as that of a smartphone.

Head mountable systems may capture images/video of the physical environment using one or more image sensors or capture audio of the physical environment using one or more microphones. Instead of an opaque display, some head mountable systems may include a transparent or translucent display. Transparent or translucent displays may direct light representative of images to a user's eyes through a medium, such as a hologram medium, optical waveguide, an optical combiner, optical reflector, other similar technologies, or combinations thereof. Various display technologies, such as liquid crystal on silicon, LEDs, uLEDs, OLEDs, laser scanning light source, digital light projection, or combinations thereof, may be used. In some examples, the transparent or translucent display may be selectively controlled to become opaque. Projection-based systems may utilize retinal projection technology that projects images onto a user's retina or may project virtual content into the physical environment, such as onto a physical surface or as a hologram.

Figure 2:
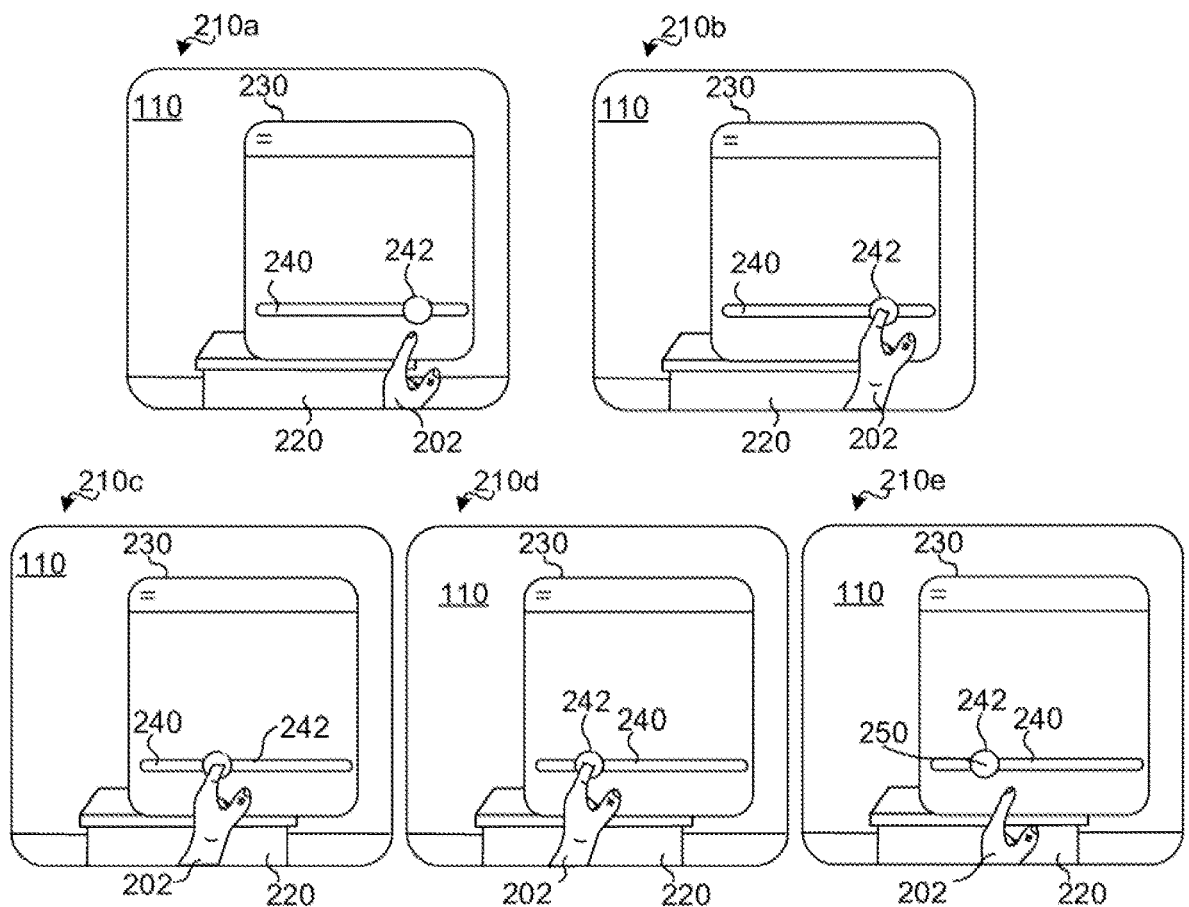
FIG. 2 illustrates views of an XR environment provided by the device of FIG. 1 based on the physical environment of FIG. 1 in which a movement including an intentional drag is interpreted, in accordance with some implementations.

FIG. 2 illustrates views 210a-e of an XR environment provided by the device of FIG. 1 based on the physical environment of FIG. 1 in which a user movement is interpreted. The views 210a-e of the XR environment include an exemplary user interface 230 of an application (i.e., virtual content) and a depiction 220 of the table 120 (i.e., real content). Providing such a view may involve determining 3D attributes of the physical environment 100 and positioning the virtual content, e.g., user interface 230, in a 3D coordinate system corresponding to that physical environment 100.

In the example of FIG. 2, the user interface 230 may include various content and user interface elements, including a scroll bar shaft 240 and its scroll bar handle 242 (also known as a scroll bar thumb). Interactions with the scroll bar handle 242 may be used by the user 202 to provide input to which the user interface 230 respond, e.g., by scrolling displayed content or otherwise. The user interface 230 may be flat (e.g., planar or curved planar without depth). Displaying the user interface 230 as a flat surface may provide various advantages. Doing so may provide an easy to understand or otherwise use portion of an XR environment for accessing the user interface of the application.

The user interface 230 may be a user interface of an application, as illustrated in this example. The user interface 230 is simplified for purposes of illustration and user interfaces in practice may include any degree of complexity, any number of user interface elements, and/or combinations of 2D and/or 3D content. The user interface 230 may be provided by operating systems and/or applications of various types including, but not limited to, messaging applications, web browser applications, content viewing applications, content creation and editing applications, or any other applications that can display, present, or otherwise use visual and/or audio content.

In some implementations, multiple user interfaces (e.g., corresponding to multiple, different applications) are presented sequentially and/or simultaneously within an XR environment using one or more flat background portions. In some implementations, the positions and/or orientations of such one or more user interfaces may be determined to facilitate visibility and/or use. The one or more user interfaces may be at fixed positions and orientations within the 3D environment. In such cases, user movements (e.g., of a user moving their head while wearing an HMD) would not affect the position or orientation of the user interfaces within the 3D environment.

In other implementations, the one or more user interfaces may be body-locked content, e.g., having a distance and orientation offset relative to a portion of the user's body (e.g., their torso). For example, the body-locked content of a user interface could be 2 meters away and 45 degrees to the left of the user's torso's forward-facing vector. While wearing an HMD, if the user's head turns while the torso remains static, a body-locked user interface would appear to remain stationary in the 3D environment at 2 m away and 45 degrees to the left of the torso's front facing vector. However, if the user does rotate their torso (e.g., by spinning around in their chair), the body-locked user interface would follow the torso rotation and be repositioned within the 3D environment such that it is still 2 m away and 45 degrees to the left of their torso's new forward-facing vector.

In other implementations, user interface content is defined at a specific distance from the user with the orientation relative to the user remaining static (e.g., if initially displayed in a cardinal direction, it will remain in that cardinal direction regardless of any head or body movement). In this example, the orientation of the body-locked content would not be referenced to any part of the user's body. In this different implementation, the body-locked user interface would not reposition itself in accordance with the torso rotation. For example, body-locked user interface may be defined to be 2 m away and, based on the direction the user is currently facing, may be initially displayed north of the user. If the user rotates their torso 180 degrees to face south, the body-locked user interface would remain 2 m away to the north of the user, which is now directly behind the user.

A body-locked user interface could also be configured to always remain gravity or horizon aligned, such that head and/or body changes in the roll orientation would not cause the body-locked user interface to move within the 3D environment. Translational movement would cause the body-locked content to be repositioned within the 3D environment in order to maintain the distance offset.

In the example of FIG. 2, at a first instant in time corresponding to view 210a, the user 102 has positioned their hand in the physical environment 100 and a corresponding depiction 202 of the user 102 shows a fingertip of the user 102 not yet touching the user interface 230. The device 110 may track user positioning, e.g., locations of the user's fingers, hands, arms, etc.

The user 102 moves their hand/finger forward in the physical environment 100 causing a corresponding movement of the depiction 202 of the user 102. Thus, at a second instant in time corresponding to the view 210b, the user 102 has positioned their hand in the physical environment 100 and a corresponding depiction 202 of the user 102 shows a fingertip of the user 102 touching or extending into a scroll bar handle 242.

The device 110 may determine positioning of the user relative to the user interface 230 (e.g., within an XR environment) and identify user interactions with the user interface based on the positional relationships between them and/or information indicative of when the user is perceiving or expecting their hand/finger to be in contact with the user interface. In this example, the device 110 detects a make point (e.g., a point in time and/or the 3D space at which contact between a user and a user interface occurs or is expected to occur) as the portion of the depiction 202 of the fingertip of the user 102 contacts the scroll bar handle 242.

Detecting such a make point may initiate a user interaction. For example, the device 110 may start tracking subsequent movement corresponding to a drag type user interaction that will be interpreted to move the scroll bar handle 242 along or otherwise based on the right/left movement of the depiction 202 of the portion of the user 102. Movement of the scroll bar handle 242 (caused by such user motion) may also trigger a corresponding user interface response, e.g., causing the user interface 230 to scroll displayed content according to the amount the scroll bar handle 242 is moved, etc.

In the example of FIG. 2, at a third instant in time corresponding to view 210c, the user 102 has moved their hand in the physical environment 100 and a corresponding depiction 202 of the user 102 has moved left with respect to the user interface 230 while the hand is still considered to be in contact with the user interface 230. Movement of the hand may continue to drag the scroll bar handle 242 in this way until a break point (e.g., a point in time and/or the 3D space at which contact between a user and a user interface occurs or is expected to be discontinued).

In this example, at a fourth instant in time corresponding to view 210d, the user 102 has continued moving their hand in the physical environment 100 and a corresponding depiction 202 of the user 102 has continued moving left with respect to the user interface 230 since the hand is still considered to be in contact with the user interface until it reaches break point 250. At the fifth instant in time corresponding to view 210e, the device 110 detects that the user has concluding the drag type user interaction and the hand is retracting as shown by the depiction 202. The segment of the user movement (e.g., movement after break point 250 at which the user begins retracting the depiction 202 away from the user interface 230) is not associated with user interface contact, e.g., it is not interpreted as part of the drag-type user interaction.

Implementations disclosed herein interpret user movements that relate to the positioning of a user interface within a 3D space so that the user movements are interpreted as direct touches with the user interface in accordance with user expectations, e.g., when the user perceives or thinks they are virtually contacting the user interface, which may not necessarily correlate precisely with when actual contact occurs between the user and the user interface depictions in the XR environment.

Some implementations determine which segments of a movement to associate with user interface content based on characteristics of the movement. In drags (i.e., where a user attempts to touch at a position on the user interface move to a second position on the user interface and release the touch at that second position), hooking can occur when a segment of the movement associated with retracting the hand is associated with UI contact in contrast to the user's expectation that such retracting would not occur during UI contact. This may cause the system to identify an incorrect break point on the user interface, i.e., using the retraction to identify the break point rather than the position on the user interface corresponding to the user's position when the drag motion ceased.

Some implementations avoid such erroneous associations (and thus more accurately interpret movements) by determining whether to associate such a segment (e.g., a potential retraction segment) based on whether the characteristics of the segment are indicative of a retraction. In other words, some implementations determine that a segment of a movement that would otherwise be associated with user interface content (e.g., based on actual position overlap) should not associated be associated with user interface contact if the segment of the motion is a retraction. This may involve determining to not associate a segment of motion with user interface contact based on determining that the segment is a retraction based on (a) assessing how aligned the segment is with a retraction axis, (b) a significance of a retraction direction change, or (c) a motion stop.

Figure 3:
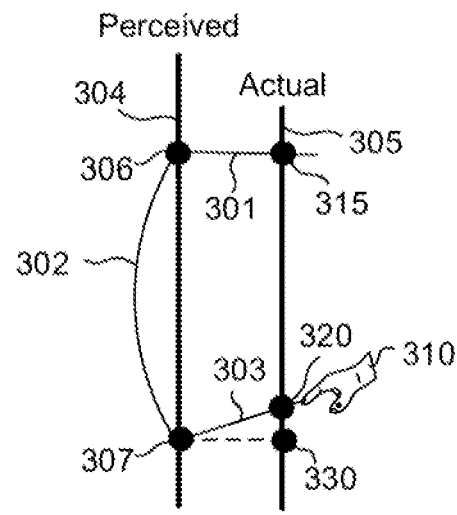
FIG. 3 illustrates interpreting a user's intentions in making a movement relative to an actual user interface position.

FIG. 3 illustrates a user's intentions in making a movement relative to an actual user interface position. In this example, during a first segment 301 of a user movement, the user 310 moves a portion of their body (e.g., their finger, hand, etc.) with the intention of making contact with a user interface. In this example, the first segment 301 of the movement extends through the actual UI plane 305 to perceived UI plane 304. The user may perceive (or otherwise expect) that the UI plane is at a location that differs from its actual position for various reasons.

Based on the user's perception of where the UI plane is, i.e., perceived UI plane 304 location, the user continues moving the portion of their body (e.g., their finger, hand, etc.) during a second segment 302 of movement in a drag-type motion, e.g., moving their finger across the user interface. The actual motion path during such a second segment 302 may be linear or non-linear (e.g., arcuate as illustrated). In this example, based on the movement during the first segment 301 and/or the second segment 302, the device 110 determines a location of a make point 315 on the actual user interface 305. In one example, the change in direction exceeding a threshold is determined as the time of the make point 315 and the make point 315 location is determined based on where the movement intersected the actual UI plane 305. In another example, the position 306 at which such a change occurred is used to determine a corresponding position on the actual UI plane 305 to use as the make point.

After the make point is established, the movement of the user is monitored and used as user input. The movement is used as input (i.e., continues to be associated with contact with the user interface) until a condition is satisfied, e.g., a break point is determined.

In this example, based on the user's perception of where the UI plane is, i.e., perceived UI plane 304 location, at the end of the intended drag motion which occurs at the end of the second segment 302, the user moves the portion of their body (e.g., their finger, hand, etc.) during a third segment 303 of movement in a retraction movement back towards themselves. During the second segment 302 and the third segment 303 of the movement, the movement is assessed to attempt to identify when and where the user expects that UI contact has concluded. This assessment may occur repeatedly, e.g., every frame, every 5 frames, every 0.1 ms, etc.) such that the association of the movement with user interface contact can be determined as soon as (or very soon after) the user stops intending to make contact with the user interface. This may involve assessing the path of the movement to determine whether a current segment of the movement has a characteristic that satisfies a retraction criterion. Such a retraction criterion may be configured to distinguish retraction motion from another type of motion (e.g., continued drag motion, swiping motion, etc.). The characteristic may be, but is not limited to being, (a) a measure of alignment between the movement direction and a retraction direction (b) a measure of retraction direction change and/or (c) whether the user (e.g., finger) has stopped.

Figure 5:
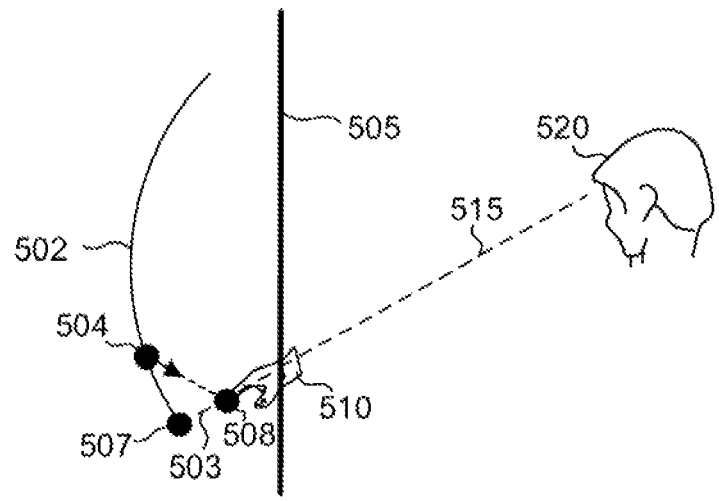
FIGS. 5-6 illustrate a movement having characteristics corresponding to a retraction in accordance with some implementations.
Figure 6:
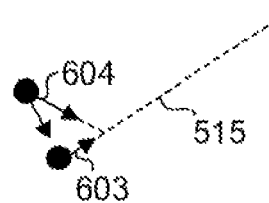
Figure 7:
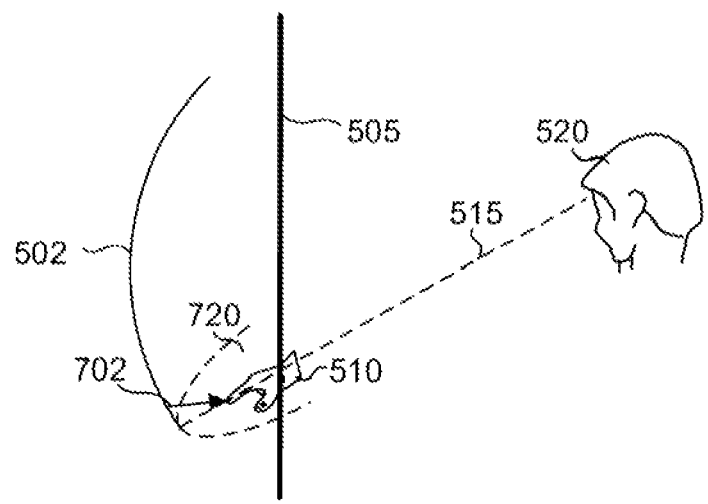
FIG. 7 illustrates a retraction dead-band in accordance with some implementations.

In the example of FIG. 3, the third segment 303 is determined to be a retraction motion. Accordingly, this third segment 303 is not treated as movement associated with user interface contact/drag input. Only the second segment 302 is treated as movement associated with user interface contact/drag input. The assessment of whether segments should be associated with user interface contact or not may be used to determine an appropriate break point for the movement. In this example, the second 302 segment transitions at point 307 to the third segment 303, i.e., association of the movement with user interface contact is determined to end at this point in time. This is used to determine a corresponding position 330 on the actual user interface 305 to use as the break point rather than the position 320 at which the user's retracting body portion (e.g., hand, finger, etc.) crossed the actual user interface 305. FIGS. 5-7, described below, provide additional examples of using movement characteristics to interpret segments of user movement, e.g., with respect to determine which segments should be associated with user interface contact.

Figure 4:
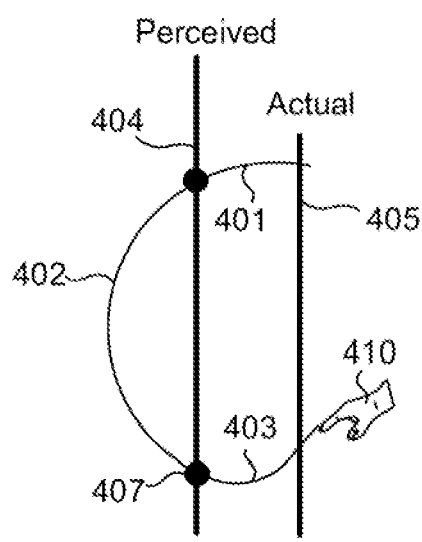
FIG. 4 illustrates interpreting a user's intentions in making a movement relative to an actual user interface position.

FIG. 4 also illustrates a user's intentions in making a movement relative to an actual user interface position. In this example, the user 410 makes a swiping movement of the portion of their body (e.g., their finger, hand, etc.). In this example, the first segment 401 of the movement swipes through the actual UI plane 405 into perceived UI plane 404. Based on the user's perception of where the UI plane is, i.e., perceived UI plane 404 location, the user continues making the swiping movement during a second segment 402 and through a third segment 403 during which the swiping motion broadly arcs back towards the user. The end of the swipe may differ from a drag retraction (e.g., as illustrated in FIG. 3) and in the movement may be used to identify the type of movement (e.g., drag or swipe) and/or treat the end of the movements (e.g., third segments 303, 403) differently.

In some implementations, the swiping movement illustrated in FIG. 4 is interpreting using a dynamic break volume to avoid unexpected gain or loss of UI-associated motion. This may involve determining that a break event occurs based on determining that the movement leaves a break volume that is adjusted dynamically based on (a) retraction confidence and/or (b) piercing depth. Intentional swipe momentum may be preserved by breaking at an appropriate time before motion is lost from an arc or retraction for example using swipe trajectory correction. FIGS. 8-11, described below, provide additional examples of using dynamic break volumes and correcting trajectory (e.g., swipe trajectory).

FIGS. 5-6 illustrate a segment of a movement having characteristics corresponding to a drag motion followed by a retraction motion. In this example, the user movement (e.g. of user 510) includes a drag segment 502 and a retraction segment 503 relative to the actual user interface 505. The movement transitions from the drag segment 502 to the retraction segment 503 at point 503. This transition is detected based on detecting that the retraction segment 503 has one or more characteristics that correspond to a retraction. In this example, a retraction direction 510 is identified based on the current position of the user 510 (e.g., finger, hand, etc.) and the user's head 520. In other examples, a retraction direction may be based on another portion of the user, e.g., the direction between the current position of the user 510 (e.g., finger, hand, etc.) and a center of the user's torso (not shown).

The retraction direction 510 may be used to determine a retraction confidence, e.g., a measure of confidence that a current segment of the movement corresponds to a retraction versus another type of motion. For example, such a retraction confidence may be based on how aligned the segment is with the retraction motion. Movement that is more aligned with the retraction direction 510 may be more likely to correspond to drag retraction movement than movement that is not aligned with (e.g., perpendicular to, etc.) the retraction direction 510. In this example, the retraction segment 503 of the movement is closely aligned with the retraction direction 510 and thus the segment is determined to be a retraction following the drag.

In some implementations, movement characteristics are used to detect retraction and/or trigger determining an early break event (i.e., prior to the user actually disconnecting from the user interface).

In some implementations, rather than using an instantaneous movement direction (e.g., direction 603) to compare with a retraction direction 515 to identify retractions, an averaged movement direction (604) may be determined and compared with a retraction direction 515 to identify retractions. This may help ensure that noise or micro-changes of direction do not inadvertently trigger a retraction detection. For example, it may be more accurate to use an averaged movement direction 604 than a current instantaneous movement direction 603 to identify retractions.

In some implementations, an average movement direction (e.g., movement 604) is determined using a lag position 504 (e.g., an index finger tip lag position) and used to assess a retraction confidence. Such a lag position 504 may be a lazy follow of the user's position (e.g., finger position) determined using a delayed moving average filter (50 ms, 125 ms). The lag position 504 may be used to determine an average movement direction $(\hat{i})$ 604 from that lag position 504 to the current position 508, e.g., $\hat{i}$=norm(current finger position−lag position). A retraction axis/direction $(\hat{r})$ 510, e.g., $\hat{r}$=norm(headpos−current finger position). The current movement direction $(\hat{i})$ 604 and the retraction axis/direction $(\hat{r})$ 515 may be used to determine a retraction confidence based on their dot product: $r_c = \hat{i} \cdot \hat{r}$. In this example, a $r_c$=1.0 is indicative of a highly confident retraction, a $r_c$=−1.0 is indicative of a highly confident piercing type movement, and a $r_c$=0.0 is indicative of a low confidence retraction (not retracting). Retraction confidence may be overridden or automatically set to zero in circumstances in which sensor data providing trajectory information is uncertain or otherwise when the trajectory of the movement is not trusted.

FIG. 7 illustrates a retraction dead-band 720. Following the example, of FIGS. 5-6, a retraction dead-band 720 is spawned based on detecting the occurrence of motion corresponding to a retraction. The retraction dead-band 720 is a region or volume of 3D space used to interpret movement, e.g., hand movement within the retraction dead-band 720 is considered a retraction. However, if the user motion leaves the retraction dead-band 720 3D space, it may no longer be considered a retraction and thus may be interpreted as input, e.g., recognized as a tap, drag, swipe, etc. A retraction dead-band may be used to distinguish motion corresponding to an input versus a movement corresponding to a retraction. The retraction dead-band may be shaped, positioned, and otherwise configured so that movement closer to the user interface 505 will be more likely to be outside of the retraction dead-band 720 than movement further from the user interface 505, and thus more likely to be interpreted as a continuous scroll, drag, etc. The retraction dead-band 720 may have various shapes, e.g., having a straight profile or a curved (e.g., exponentially curved) profile.

In FIG. 7, the retraction dead-band 720 is aligned with (e.g., centered on) the retraction axis/direction 515 such that any in-plane motion is discarded. Movement during the retraction segment 503 that is within the retraction dead-band 720 will not be associated with user interface contact, e.g., will not continue to affect the drag response. However, if the movement exits the retraction dead-band 720, it may resume being treated as movement associated with user interface contact. The retraction dead-band 720 may be configured to timeout after a threshold amount of time.

Figure 8:
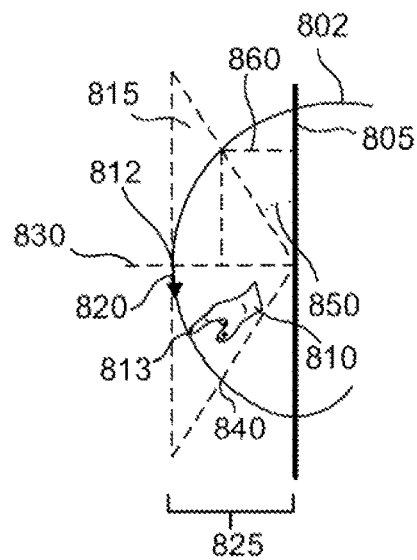
FIGS. 8-9 illustrate a dynamic break volume in accordance with some implementations.
Figure 9:
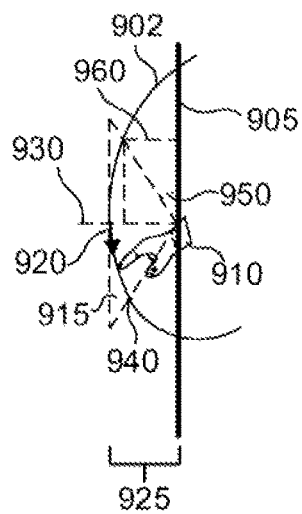

FIGS. 8-9 illustrate a dynamic break volume. Such a break volume may be particularly useful with respect to swipe type input. Swipes tend to be faster than drag interactions and have more arc. When swiping, a user may expect to preserve the motion/velocity at the point in time/space when the perceive that UI contact is broken. For example, the user may swipe and expect the swipe to initiate a scroll that continues after UI contact is broken based on the speed of movement when the UI content ends. However, this perceived break may not coincide precisely with the actual break of contact from the user interface. Some implementations disclosed herein utilize a dynamic break volume to, among other things, preserve the user's intentional swipe momentum, e.g., by breaking early before motion is lost from an arc or retraction.

FIG. 8 illustrates a user movement 802 (of user 810) relative to a user interface 805. A break volume 815 is generated and used to determine when to break the swipe motion, i.e., discontinue associating the movement 802 with user interface contact. The break volume 815 may be adjusted in shape or position over time, for example, based on the current position of the user 810 or a position (e.g., a lag position) determined based on the current position of the user 810. In this example, an axis 830 of the break volume 815 is aligned with a target axis (e.g., the z axis of a user interface 805 based on a current lag position 812). The current lag position 812 may be determined based on the current user position 813, e.g., based on lag parameters e.g., a predetermined lag period, lag distance, etc. In this example, the break volume 815 is a centroid $C_{xy}$ that tracks a lag (e.g., $index_{lag}$ 820 associated with an index finger tip position). The break volume 815 may be configured to change shape, position, and/or orientation based the movement 802 and/or during the movement 802. The break volume 815 may expand and contract in an umbrella-like way remaining symmetrical about the axis 830 while potentially shifting laterally relative to the user interface (e.g., shifting down in FIG. 8. The break volume 815 may be shifted based on retraction confidence, and/or be increased in slope based on piercing direction depth 825 (e.g., tracking $index_{lag}$ 820).

In some implementations, a break volume 815 is not symmetrical, e.g., not symmetrical about axis 830. For example, a break volume 815 may include only a lower portion below the axis 830. In some implementations, a break volume 815 is symmetrical about an axis that is not perpendicular/orthogonal to user interface 805. For example, a break volume may be symmetrical about an axis that is at a predetermined angle relative the user interface, where the predetermined angle is determined based on user-specific characteristics, e.g., the user's typical motion path characteristics when making a gesture of a given type.

In an alternative implementation, break volume 815 is determined based on a predicted path, e.g., based trajectory, speed, or other characteristics of a user motion. For example, the break volume 815 may be determined based on a predicted path that is predicted when a gesture is initially recognized, e.g., as a swipe gesture, and associated with speed, direction, path or other motion characteristics. In some implementations, based on one or more points along a predicted path, a break volume 815 may be configured with respect to shape and position. In some implementations, a break volume is determined and/or adjusted over time during the course of a user motion based on both a current user position and a predicted user path.

FIG. 9 illustrates a different user movement 902 (of user 910) relative to a user interface 905. A break volume 915 is generated and dynamically altered during the movement 902. The break volume 915 is used to determine when to break the swipe motion, i.e., discontinue associating the movement 902 with user interface contact. In this example, an axis 930 of the break volume 915 is aligned with a target axis (e.g., the z axis of a user interface 905 based on a current lag position). In this example, the break volume 915 is a centroid $C_{xy}$ that tracks a lag (e.g., $index_{lag}$ 920 associated with an index finger tip position). The break volume 915 may be configured to change shape, position, and/or orientation based the movement 902 and/or during the movement 902. The break volume 915 may expand and contract in an umbrella-like way, shifting based on retraction confidence and/or increasing in slope based on piercing direction depth 925 (e.g., tracking $index_{lag}$ 920).

FIGS. 8 and 9 illustrate how different movements 802, 902 can be interpreted using different dynamic break volumes 815, 915. Based on the different movements 802, 902 illustrated in FIGS. 8 and 9, the respective dynamic break volumes 815, 915 have different shapes, sizes, and positions. Moreover, during a given movement, the location, shape, and/or orientation of a given break volume is dynamically adjusted to correspond to the current state of the movement. The position of the break volume moves to adapt to the user's current position, depth, and movement path. Using dynamic (context-specific) break volumes may enable a device to better determine break events in different circumstances and ultimately to interpret user movement more consistently with user expectations than when using a fixed (one-size-fits-all break volume).

The shape of the break volumes 815, 915 may be determined using parameters that allow the break volume to be customized for a particular implementation. Such parameters may include: β (slope sensitivity) corresponding to how sensitive the slope is to changes piercing depth; and a (piercing depth scalar) corresponding to how much the break/volume centroid can shift. These parameters may be used to determine the characteristics of the centroid of the break volumes 815, 915. For example, length $D_0$ 860, 960 may be determined based on the lag 820, 920 and the piercing depth scalar: e.g., $D_0 = index_{lag} * \alpha$. The slope θ 850, 950 may be determined based on the length $D_0$ 860, 960 and the slope sensitivity: e.g., $\theta = 90 - atan\ 2(D_0, \beta)$. The axis $C_z$ 830, 930 of the break volume 815, 915 may be determined based on the retraction confidence re (e.g., determined via techniques disclosed herein) and piercing depth 825, 925: e.g., $C_z = map\ (|r_c|, depth)$. The positioning of the break volume 815, 915 with respect to the other dimensions (e.g., x/y) may depend upon the lag position, e.g., $index_{lag(xy)}$: e.g., $C_{xy} = index_{lag(xy)}$.

Figure 10:
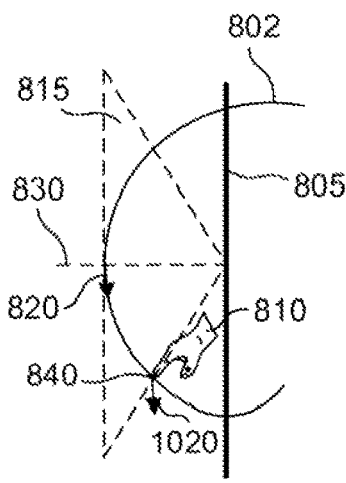
FIGS. 10-11 illustrate a trajectory correction in accordance with some implementations.
Figure 11:
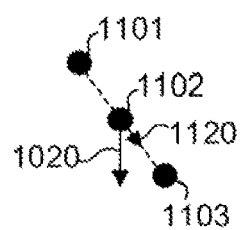

FIGS. 10-11 illustrate a trajectory correction based on the movement 802 of FIG. 8. Natural arcing (e.g., during a swipe) may cause lost motion on break, which may result in UI issues such as "effortful" scrolls. Some implementations preserve intentional swipe velocity on break without introducing noticeable hooks of changes in velocity. Some implementations dampen aggressive hooking that was not broken early via other techniques, e.g., not broken early based on a drag retraction detection.

FIGS. 10-11 illustrate determining a corrected trajectory 1020 to associate with the movement 802 rather than the instantaneous trajectory 1120. In this example, a lag (i.e., index lag direction (ĥ)) is used to determine the corrected trajectory 1020. The index lag direction may be determined based on the current index position and a prior index position (e.g., the prior frame's position): e.g., $\hat{h}$=norm (index$_{gt}$−index$_{lag}$). A position difference (Δ pos) may be determined based on the current index position and the prior index position: e.g., Δ pos=index$_{gt}$−index$_{prev}$. If the segment of the movement has not yet been classified as a drag, the device may predict whether the next frame's Δ (e.g., at position 1103) will be outside of the break volume 815. If so, the device makes this frame's positional Δ in line with the direction $\hat{h}$, e.g., it corrects the trajectory if the movement is predicted to leave the break volume 815 in the next frame. This technique may suppress some "kick-back" of hooks of failed swipes and should not impact failed drags.

Figure 12:
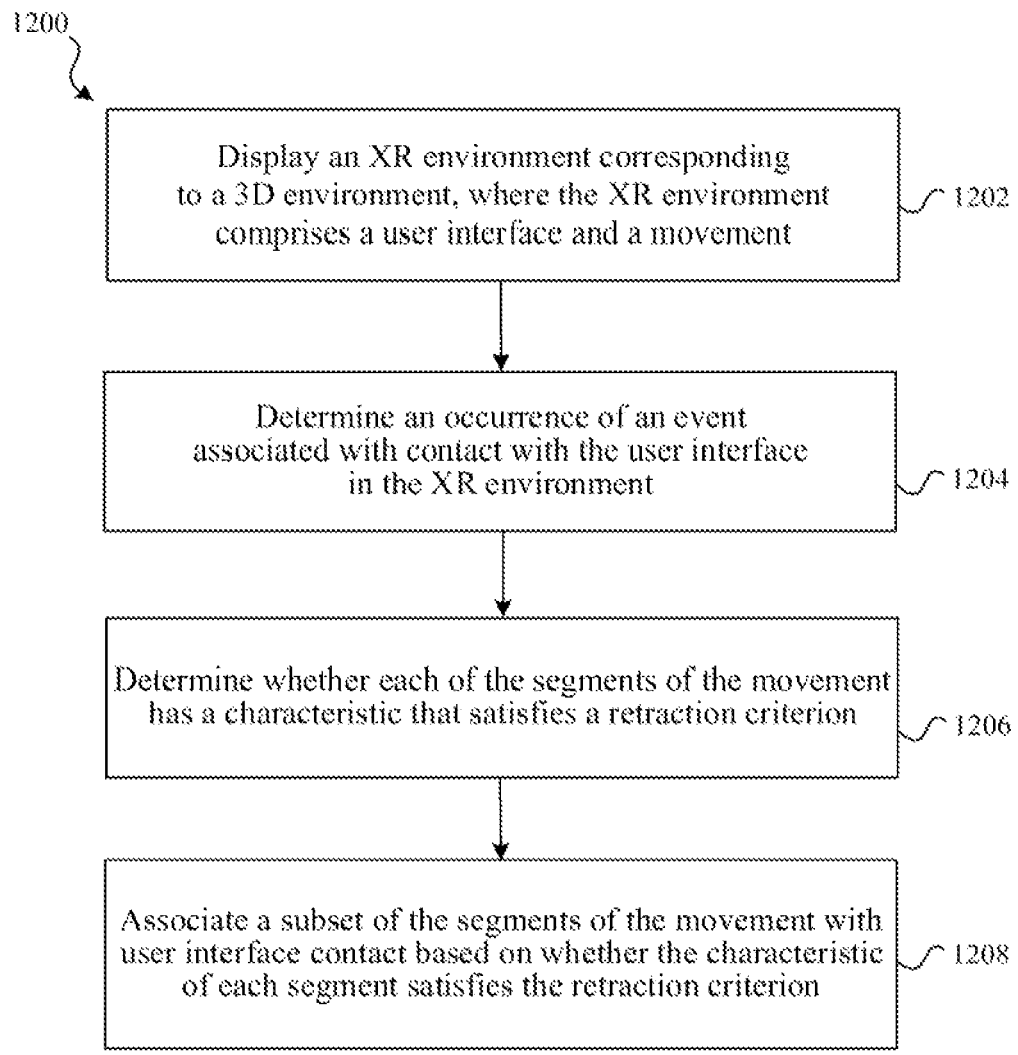
FIG. 12 is a flowchart illustrating a method for determining which segments of a movement to associate with user interface content based on characteristics of the movement, in accordance with some implementations.

FIG. 12 is a flowchart illustrating a method 1200 for determining which segments of a movement to associate with user interface content based on characteristics of the movement. In some implementations, a device such as electronic device 110 performs method 1200. In some implementations, method 1200 is performed on a mobile device, desktop, laptop, HMD, or server device. The method 1200 is performed by processing logic, including hardware, firmware, software, or a combination thereof. In some implementations, the method 1200 is performed on a processor executing code stored in a non-transitory computer-readable medium (e.g., a memory).

At block 1202, the method 1200 displays an XR environment corresponding to a 3D environment, where the XR environment comprises a user interface and a movement. The movement comprising segments.

At block 1204, the method 1200 determines an occurrence of an event (e.g., a make contact event) associated with contact with the user interface in the XR environment, e.g., based on determining that contact with the UI occurred, was intended to occur, or was perceived by the user. This may involve determining when the user has pierced the user interface. This may involve indicating that a direct touch gesture is in effect, an input criterion (e.g., drag and/or swipe criterion) has been satisfied, and that the movement is being tracked with respect to being input to the user interface.

At block 1206, the method 1200 determines whether each of the segments of the movement has a characteristic that satisfies a drag retraction criterion. The drag retraction criterion is configured to distinguish retraction motion following a drag from another type of motion. The device may use one or more sensors to track a portion of the user (e.g., the user's hands, finger, finger-tip, index finger-tip, etc.). As examples, the characteristic may be, but is not limited to being, (a) a measure of alignment between the movement direction during the respective segment and a retraction direction (b) a measure how quickly movement direction changes and/or (c) whether the user (e.g., hand/finger) has stopped moving. FIGS. 3, 5, and 6 illustrate characteristics that may be used to assess whether a segment satisfies a drag retraction criterion.

In some implementations, the characteristic comprises a drag retraction confidence determined based on alignment between a direction of the movement during a respective segment and a retraction direction. The retraction direction is a direction from a portion of the user being used for interaction (e.g., finger, hand, etc.) to a head a central portion of the user (e.g., head, torso, etc.). The drag retraction criterion may be whether the drag retraction confidence exceeds a threshold.

In some implementations, the drag retraction criterion is whether a change in the drag retraction confidence exceeds a threshold (e.g., a kink threshold). A rapid change in the drag retraction confidence may correspond to a rapid change in movement direction relative to a retraction axis, which may be indicative that the intended motion of the user touching the user interface has concluded. Similarly, the drag retraction criterion may comprise whether a portion of the user has stopped moving (e.g., is currently moving at a rate below a threshold speed 0.1 m/s). Stopping may be indicative that the intended motion of the user touching the user interface has concluded or that the user has or is about to begin a retraction.

At block 1208, the method 1200 associates a subset (e.g., one, some, or all) of the segments of the movement with user interface contact based on whether the characteristic of each of the segments satisfies the drag retraction criterion. In some implementations, the association of select segments is achieved by implementing a drag retraction dead-band such that movement occurring during the retraction (because such movement is within the drag retraction dead-band) is not recognized as user interface contact motion. FIG. 7 illustrates an exemplary drag retraction deadband.

Figure 13:
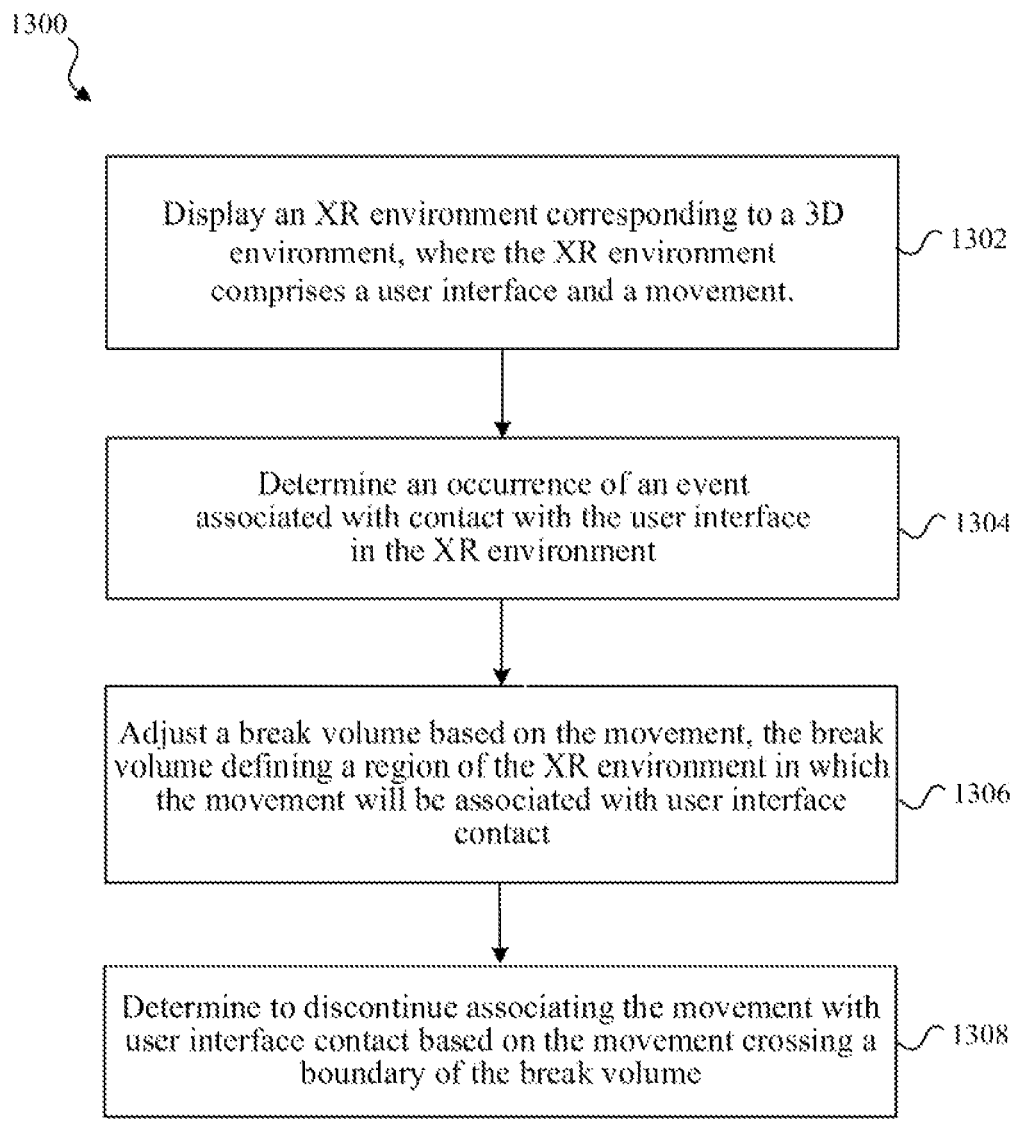
FIG. 13 is a flowchart illustrating a method for interpreting a movement using a dynamic break volume in accordance with some implementations.

FIG. 13 is a flowchart illustrating a method 1300 for interpreting a movement using a dynamic break volume. In some implementations, a device such as electronic device 110 performs method 1300. In some implementations, method 1300 is performed on a mobile device, desktop, laptop, HMD, or server device. The method 1300 is performed by processing logic, including hardware, firmware, software, or a combination thereof. In some implementations, the method 1300 is performed on a processor executing code stored in a non-transitory computer-readable medium (e.g., a memory).

At block 1302, the method 1300 displays an XR environment corresponding to a 3D) environment, where the XR environment comprises a user interface and a movement.

At block 1304, the method 1300 determines an occurrence of an event (e.g., a make contact event) associated with contact with the user interface in the XR environment, e.g., based on determining that contact with the UI occurred, was intended to occur, or was perceived by the user. This may involve determining when the user has pierced the user interface. This may involve indicating that a direct touch gesture is in effect, an input criterion (e.g., drag and/or swipe criterion) has been satisfied, and that the movement is being tracked with respect to being input to the user interface.

At block 1306, the method 1300 adjusts a break volume based on the movement, the break volume defining a region of the XR environment in which the movement will be associated with user interface contact. Adjusting the break volume may involve shifting the break volume based on a retraction confidence, where the retraction confidence is based on alignment between a direction of the movement and a retraction direction. The retraction direction may be a direction from a portion of the user used for interaction (e.g., hand, finger, etc.) to a central portion of the user (e.g., head, torso, etc.). Adjusting the break volume may involve adjusting a slope of the break volume based on a piercing depth of the movement. Examples of adjusting a break volume are illustrated in FIGS. 8-9.

At block 1308, the method 1300 determines to discontinue associating the movement with user interface contact (e.g., determine that a break event has occurred) based on the movement crossing a boundary of the break volume.

In some implementations, a trajectory correction is provided. For example, this may involve adjusting a velocity associated with a first time (e.g., correcting trajectory direction of the current frame) based on determining that the movement will cross outside the boundary of the break volume at the subsequent time (e.g., next frame). The velocity associated with the first time may be adjusted based on a velocity of a prior time. Examples of trajectory correction are provided in FIGS. 10-11.

Figure 14:
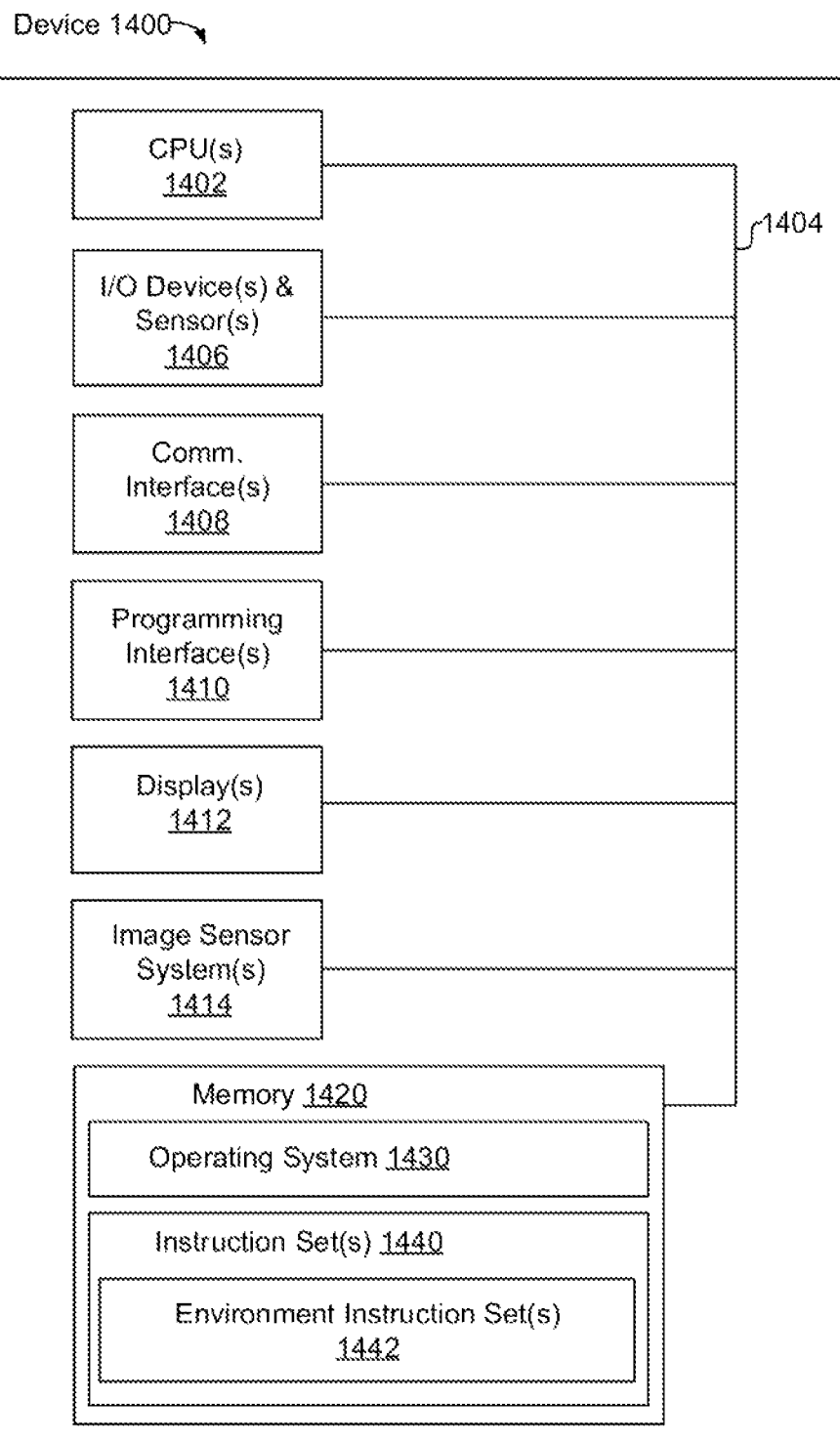
FIG. 14 is a block diagram of an electronic device of in accordance with some implementations.

FIG. 14 is a block diagram of electronic device 1400. Device 1400 illustrates an exemplary device configuration for electronic device 110. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the device 1400 includes one or more processing units 1402 (e.g., microprocessors, ASICs, FPGAs, GPUs, CPUs, processing cores, and/or the like), one or more input/output (I/O) devices and sensors 1406, one or more communication interfaces 1408 (e.g., USB, FIREWIRE, THUNDERBOLT, IEEE 802.3x, IEEE 802.11x, IEEE 802.16x, GSM, CDMA, TDMA, GPS, IR, BLUETOOTH, ZIGBEE, SPI, I2C, and/or the like type interface), one or more programming (e.g., I/O) interfaces 1410, one or more output device(s) 1412, one or more interior and/or exterior facing image sensor systems 1414, a memory 1420, and one or more communication buses 1404 for interconnecting these and various other components.

In some implementations, the one or more communication buses 1404 include circuitry that interconnects and controls communications between system components. In some implementations, the one or more I/O devices and sensors 1406 include at least one of an inertial measurement unit (IMU), an accelerometer, a magnetometer, a gyroscope, a thermometer, one or more physiological sensors (e.g., blood pressure monitor, heart rate monitor, blood oxygen sensor, blood glucose sensor, etc.), one or more microphones, one or more speakers, a haptics engine, one or more depth sensors (e.g., a structured light, a time-of-flight, or the like), and/or the like.

In some implementations, the one or more output device(s) 1412 include one or more displays configured to present a view of a 3D environment to the user. In some implementations, the one or more displays 1412 correspond to holographic, digital light processing (DLP), liquid-crystal display (LCD), liquid-crystal on silicon (LCoS), organic light-emitting field-effect transitory (OLET), organic light-emitting diode (OLED), surface-conduction electron-emitter display (SED), field-emission display (FED), quantum-dot light-emitting diode (QD-LED), micro-electromechanical system (MEMS), and/or the like display types. In some implementations, the one or more displays correspond to diffractive, reflective, polarized, holographic, etc. waveguide displays. In one example, the device 1400 includes a single display. In another example, the device 1400 includes a display for each eye of the user.

In some implementations, the one or more output device(s) 1412 include one or more audio producing devices. In some implementations, the one or more output device(s) 1412 include one or more speakers, surround sound speakers, speaker-arrays, or headphones that are used to produce spatialized sound, e.g., 3D audio effects. Such devices may virtually place sound sources in a 3D environment, including behind, above, or below one or more listeners. Generating spatialized sound may involve transforming sound waves (e.g., using head-related transfer function (HRTF), reverberation, or cancellation techniques) to mimic natural soundwaves (including reflections from walls and floors), which emanate from one or more points in a 3D environment. Spatialized sound may trick the listener's brain into interpreting sounds as if the sounds occurred at the point(s) in the 3D environment (e.g., from one or more particular sound sources) even though the actual sounds may be produced by speakers in other locations. The one or more output device(s) 1412 may additionally or alternatively be configured to generate haptics.

In some implementations, the one or more image sensor systems 1414 are configured to obtain image data that corresponds to at least a portion of a physical environment. For example, the one or more image sensor systems 1414 may include one or more RGB cameras (e.g., with a complimentary metal-oxide-semiconductor (CMOS) image sensor or a charge-coupled device (CCD) image sensor), monochrome cameras, IR cameras, depth cameras, event-based cameras, and/or the like. In various implementations, the one or more image sensor systems 1414 further include illumination sources that emit light, such as a flash. In various implementations, the one or more image sensor systems 1414 further include an on-camera image signal processor (ISP) configured to execute a plurality of processing operations on the image data.

The memory 1420 includes high-speed random-access memory, such as DRAM, SRAM, DDR RAM, or other random-access solid-state memory devices. In some implementations, the memory 1420 includes non-volatile memory, such as one or more magnetic disk storage devices, optical disk storage devices, flash memory devices, or other non-volatile solid-state storage devices. The memory 1420 optionally includes one or more storage devices remotely located from the one or more processing units 1402. The memory 1420 comprises a non-transitory computer readable storage medium.

In some implementations, the memory 1420 or the non-transitory computer readable storage medium of the memory 1420 stores an optional operating system 1430 and one or more instruction set(s) 1440. The operating system 1430 includes procedures for handling various basic system services and for performing hardware dependent tasks. In some implementations, the instruction set(s) 1440 include executable software defined by binary information stored in the form of electrical charge. In some implementations, the instruction set(s) 1440 are software that is executable by the one or more processing units 1402 to carry out one or more of the techniques described herein.

The instruction set(s) 1440 include environment instruction set(s) 1442 configured to, upon execution, identify and/or interpret movements relative to a user interface as described herein. The instruction set(s) 1440 may be embodied as a single software executable or multiple software executables.

Although the instruction set(s) 1440 are shown as residing on a single device, it should be understood that in other implementations, any combination of the elements may be located in separate computing devices. Moreover, the figure is intended more as functional description of the various features which are present in a particular implementation as opposed to a structural schematic of the implementations described herein. As recognized by those of ordinary skill in the art, items shown separately could be combined and some items could be separated. The actual number of instructions sets and how features are allocated among them may vary from one implementation to another and may depend in part on the particular combination of hardware, software, and/or firmware chosen for a particular implementation.

It will be appreciated that the implementations described above are cited by way of example, and that the present invention is not limited to what has been particularly shown and described hereinabove. Rather, the scope includes both combinations and sub combinations of the various features described hereinabove, as well as variations and modifications thereof which would occur to persons skilled in the art upon reading the foregoing description and which are not disclosed in the prior art.

As described above, one aspect of the present technology is the gathering and use of sensor data that may include user data to improve a user's experience of an electronic device. The present disclosure contemplates that in some instances, this gathered data may include personal information data that uniquely identifies a specific person or can be used to identify interests, traits, or tendencies of a specific person. Such personal information data can include movement data, physiological data, demographic data, location-based data, telephone numbers, email addresses, home addresses, device characteristics of personal devices, or any other personal information.

The present disclosure recognizes that the use of such personal information data, in the present technology, can be used to the benefit of users. For example, the personal information data can be used to improve the content viewing experience. Accordingly, use of such personal information data may enable calculated control of the electronic device. Further, other uses for personal information data that benefit the user are also contemplated by the present disclosure.

The present disclosure further contemplates that the entities responsible for the collection, analysis, disclosure, transfer, storage, or other use of such personal information and/or physiological data will comply with well-established privacy policies and/or privacy practices. In particular, such entities should implement and consistently use privacy policies and practices that are generally recognized as meeting or exceeding industry or governmental requirements for maintaining personal information data private and secure. For example, personal information from users should be collected for legitimate and reasonable uses of the entity and not shared or sold outside of those legitimate uses. Further, such collection should occur only after receiving the informed consent of the users. Additionally, such entities would take any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices.

Despite the foregoing, the present disclosure also contemplates implementations in which users selectively block the use of, or access to, personal information data. That is, the present disclosure contemplates that hardware or software elements can be provided to prevent or block access to such personal information data. For example, in the case of user-tailored content delivery services, the present technology can be configured to allow users to select to "opt in" or "opt out" of participation in the collection of personal information data during registration for services. In another example, users can select not to provide personal information data for targeted content delivery services. In yet another example, users can select to not provide personal information, but permit the transfer of anonymous information for the purpose of improving the functioning of the device.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences or settings based on non-personal information data or a bare minimum amount of personal information, such as the content being requested by the device associated with a user, other non-personal information available to the content delivery services, or publicly available information.

In some embodiments, data is stored using a public/private key system that only allows the owner of the data to decrypt the stored data. In some other implementations, the data may be stored anonymously (e.g., without identifying and/or personal information about the user, such as a legal name, username, time and location data, or the like). In this way, other users, hackers, or third parties cannot determine the identity of the user associated with the stored data. In some implementations, a user may access their stored data from a user device that is different than the one used to upload the stored data. In these instances, the user may be required to provide login credentials to access their stored data.

Numerous specific details are set forth herein to provide a thorough understanding of the claimed subject matter. However, those skilled in the art will understand that the claimed subject matter may be practiced without these specific details. In other instances, methods apparatuses, or systems that would be known by one of ordinary skill have not been described in detail so as not to obscure claimed subject matter.

Unless specifically stated otherwise, it is appreciated that throughout this specification discussions utilizing the terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general-purpose computing apparatus to a specialized computing apparatus implementing one or more implementations of the present subject matter. Any suitable programming, scripting, or other type of language or combinations of languages may be used to implement the teachings contained herein in software to be used in programming or configuring a computing device.

Implementations of the methods disclosed herein may be performed in the operation of such computing devices. The order of the blocks presented in the examples above can be varied for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or value beyond those recited. Headings, lists, and numbering included herein are for ease of explanation only and are not meant to be limiting.

It will also be understood that, although the terms "first," "second," etc. may be used herein to describe various elements, these elements should not be limited by these terms. These terms are only used to distinguish one element from another. For example, a first node could be termed a second node, and, similarly, a second node could be termed a first node, which changing the meaning of the description, so long as all occurrences of the "first node" are renamed consistently and all occurrences of the "second node" are renamed consistently. The first node and the second node are both nodes, but they are not the same node.

The terminology used herein is for the purpose of describing particular implementations only and is not intended to be limiting of the claims. As used in the description of the implementations and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

The foregoing description and summary of the invention are to be understood as being in every respect illustrative and exemplary, but not restrictive, and the scope of the invention disclosed herein is not to be determined only from the detailed description of illustrative implementations but according to the full breadth permitted by patent laws. It is to be understood that the implementations shown and described herein are only illustrative of the principles of the present invention and that various modification may be implemented by those skilled in the art without departing from the scope and spirit of the invention.

What is claimed is:

1. A method comprising:
  at an electronic device having a processor:
    displaying an extended reality (XR) environment corresponding to a three-dimensional (3D) environment, wherein the XR environment comprises a user interface and a movement, the movement comprising segments;
    determining an occurrence of an event associated with contact with the user interface in the XR environment;
    determining whether each of the segments of the movement has a characteristic that satisfies a retraction criterion, the retraction criterion configured to distinguish retraction motion from another type of motion; and
    associating a subset of the segments of the movement with user interface contact based on whether the characteristic of each of the segments satisfies the retraction criterion.

2. The method of claim 1, wherein the characteristic comprises a retraction confidence determined based on alignment between a direction of the movement during a respective segment and a retraction direction.

3. The method of claim 2, wherein the retraction direction is a direction from a portion of the user to a head of the user.

4. The method of claim 2, wherein the retraction criterion is whether the retraction confidence exceeds a threshold.

5. The method of claim 2, wherein the retraction criterion is whether a change in the retraction confidence exceeds a threshold.

6. The method of claim 1, wherein the retraction criterion comprises whether a portion of the user has stopped moving.

7. The method of claim 1, wherein associating a subset of the segments of the movement with user interface contact comprises generating a retraction dead-band.

8. The method of claim 1, wherein the movement corresponds to a movement of a fingertip or hand.

9. The method of claim 1, wherein the electronic device is a head-mounted device.

10. A system comprising:
  a non-transitory computer-readable storage medium; and
  one or more processors coupled to the non-transitory computer-readable storage medium, wherein the non-transitory computer-readable storage medium comprises program instructions that, when executed on the one or more processors, cause the system to perform operations comprising:
  determining an occurrence of an event associated with contact with the user interface in the XR environment;
  displaying an extended reality (XR) environment corresponding to a three-dimensional (3D) environment, wherein the XR environment comprises a user interface and a movement, the movement comprising segments;
  determining whether each of the segments of the movement has a characteristic that satisfies a retraction criterion, the retraction criterion configured to distinguish retraction motion from another type of motion; and
  associating a subset of the segments of the movement with user interface contact based on whether the characteristic of each of the segments satisfies the retraction criterion.

11. The system of claim 10, wherein the characteristic comprises a retraction confidence determined based on alignment between a direction of the movement during a respective segment and a retraction direction.

12. The system of claim 11, wherein the retraction direction is a direction from a portion of the user to a head of the user.

13. The system of claim 11, wherein the retraction criterion is whether the retraction confidence exceeds a threshold.

14. The system of claim 11, wherein the retraction criterion is whether a change in the retraction confidence exceeds a threshold.

15. The system of claim 10, wherein the retraction criterion comprises whether a portion of the user has stopped moving.

16. The system of claim 10, wherein associating a subset of the segments of the movement with user interface contact comprises generating a retraction dead-band.

17. The system of claim 10, wherein the movement corresponds to a movement of a fingertip or hand.

18. The system of claim 10, wherein the system is a head-mounted device.

19. A non-transitory computer-readable storage medium storing program instructions executable via one or more processors to perform operations comprising:
- displaying an extended reality (XR) environment corresponding to a three-dimensional (3D) environment, wherein the XR environment comprises a user interface and a movement, the movement comprising segments;
- determining an occurrence of an event associated with contact with the user interface in the XR environment;
- determining whether each of the segments of the movement has a characteristic that satisfies a retraction criterion, the retraction criterion configured to distinguish retraction motion from another type of motion; and
- associating a subset of the segments of the movement with user interface contact based on whether the characteristic of each of the segments satisfies the retraction criterion.

20. The non-transitory computer-readable storage medium of claim 19, wherein the characteristic comprises a retraction confidence determined based on alignment between a direction of the movement during a respective segment and a retraction direction.

21. The non-transitory computer-readable storage medium of claim 20, wherein the retraction direction is a direction from a portion of the user to a head of the user.

22. The non-transitory computer-readable storage medium of claim 20, wherein the retraction criterion is whether the retraction confidence exceeds a threshold.

23. The non-transitory computer-readable storage medium of claim 20, wherein the retraction criterion is whether a change in the retraction confidence exceeds a threshold.

24. The non-transitory computer-readable storage medium of claim 19, wherein the retraction criterion comprises whether a portion of the user has stopped moving.

25. The non-transitory computer-readable storage medium of claim 19, wherein associating a subset of the segments of the movement with user interface contact comprises generating a retraction dead-band.

\* \* \* \* \*